United States Patent
Couse et al.

(10) Patent No.: US 9,678,501 B2
(45) Date of Patent: Jun. 13, 2017

(54) SERIALIZATION OF FUEL CELL COMPONENTS

(71) Applicant: Bloom Energy Corporation, Sunnyvale, CA (US)

(72) Inventors: Stephen Couse, Sunnyvale, CA (US); Tulin Akin, Sunnyvale, CA (US); Matthias Gottmann, Sunnyvale, CA (US); Harald Herchen, Los Altos, CA (US); Arne Ballantine, Palo Alto, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 656 days.

(21) Appl. No.: 14/149,187

(22) Filed: Jan. 7, 2014

(65) Prior Publication Data

US 2014/0195031 A1    Jul. 10, 2014

Related U.S. Application Data

(60) Provisional application No. 61/750,179, filed on Jan. 8, 2013.

(51) Int. Cl.
G05B 19/418    (2006.01)

(52) U.S. Cl.
CPC .................. *G05B 19/4183* (2013.01); *G05B 2219/49302* (2013.01); *H01M 2250/00* (2013.01); *Y02P 90/10* (2015.11)

(58) Field of Classification Search
CPC ...... G05B 19/4183; G05B 2219/49302; Y02P 90/10; G06T 7/00; G06T 7/001; H01M 8/00; H01M 8/04952
See application file for complete search history.

(56) References Cited

U.S. PATENT DOCUMENTS

| 2,176,784 | A | 10/1939 | Bowden |
| 5,589,772 | A | 12/1996 | Kugai |

(Continued)

FOREIGN PATENT DOCUMENTS

| JP | 2000-285934 A | 10/2000 |
| JP | 2007-042406 A | 2/2007 |
| KR | 10-2010-0109253 A | 10/2010 |

OTHER PUBLICATIONS

International Search Report & Written Opinion, International Application No. PCT/US2011/062328, Aug. 1, 2012.

(Continued)

*Primary Examiner* — Ramesh Patel
(74) *Attorney, Agent, or Firm* — The Marbury Law Gorup PLLC

(57) ABSTRACT

Systems and methods for fuel cell stack part serialization and tracking. In an embodiment, a barcode may be applied to a fuel cell stack part which may identify the fuel cell stack part. In an embodiment, the barcode may be applied as ink on a green fuel cell stack part prior to sintering. In an embodiment, a portion of a fuel cell stack part may be imaged and pattern recognition techniques may be utilized to identify the fuel cell stack part based on the unique features of fuel cell stack part. In an embodiment, portion of a fuel cell stack part may be measured to generate one or more series of unique volume/area values and one or more series of unique volume/area values may be utilized to identify the fuel cell stack part.

10 Claims, 29 Drawing Sheets

(56) References Cited

U.S. PATENT DOCUMENTS

| | | | | |
|---|---|---|---|---|
| 6,078,845 | A * | 6/2000 | Friedman | H01L 21/67282 438/166 |
| 6,426,161 | B1 | 7/2002 | Cisar et al. | |
| 6,427,092 | B1 * | 7/2002 | Jones | G01R 31/31718 209/573 |
| 6,529,793 | B1 * | 3/2003 | Beffa | G01R 31/2894 250/234 |
| 6,599,651 | B1 | 7/2003 | Saitou et al. | |
| 6,609,041 | B1 * | 8/2003 | Sanka | B29D 11/00125 264/334 |
| 6,646,418 | B1 * | 11/2003 | Xie | G01R 31/3658 320/120 |
| 7,585,581 | B2 * | 9/2009 | Kaye | H01M 8/0202 429/424 |
| 7,888,906 | B2 * | 2/2011 | Dunn | H01M 8/04089 320/101 |
| 7,970,484 | B2 * | 6/2011 | Fontanot | G05B 19/4183 700/115 |
| 8,067,131 | B2 * | 11/2011 | Hammerschmidt | H01M 8/0206 429/471 |
| 9,233,623 | B2 * | 1/2016 | Fernandez | B60L 1/00 |
| 9,379,339 | B2 * | 6/2016 | Inoue | H01L 51/0096 |
| 2004/0086768 | A1 * | 5/2004 | Fleckner | B82Y 30/00 429/457 |
| 2004/0095127 | A1 * | 5/2004 | Mohri | G01R 31/3606 324/117 R |
| 2005/0097520 | A1 * | 5/2005 | Wolters | G06F 13/105 717/134 |
| 2005/0136301 | A1 * | 6/2005 | Knaggs | H01M 8/0432 429/432 |
| 2005/0142431 | A1 | 6/2005 | Shimomura et al. | |
| 2006/0127711 | A1 | 6/2006 | Kaschmitter et al. | |
| 2006/0228613 | A1 | 10/2006 | Bourgeois et al. | |
| 2007/0184315 | A1 * | 8/2007 | Kelly | H01M 8/04343 429/431 |
| 2008/0199738 | A1 | 8/2008 | Perry et al. | |
| 2009/0220827 | A1 * | 9/2009 | Knaggs | H01M 8/04552 429/483 |
| 2010/0221633 | A1 * | 9/2010 | Fujita | H01M 8/0258 429/452 |
| 2010/0273069 | A1 * | 10/2010 | Crumm | H01M 8/04201 429/410 |
| 2011/0229790 | A1 * | 9/2011 | Sato | H01M 8/0278 429/469 |
| 2012/0135337 | A1 | 5/2012 | Herchen et al. | |
| 2012/0256732 | A1 * | 10/2012 | McAllister | B65C 9/1865 340/10.2 |
| 2013/0337353 | A1 * | 12/2013 | Yemul | H01M 8/04298 429/428 |
| 2014/0057138 | A1 * | 2/2014 | Brett | H01M 8/0228 429/7 |
| 2014/0162149 | A1 * | 6/2014 | Niimi | H01M 4/8885 429/405 |
| 2014/0189989 | A1 * | 7/2014 | Flitsch | H01L 21/67178 29/25.01 |
| 2014/0295318 | A1 * | 10/2014 | Ando | H01M 8/0243 429/495 |
| 2016/0190621 | A1 * | 6/2016 | Adams | H01M 8/04194 429/444 |

OTHER PUBLICATIONS

Huth et al., "Lock-in IR-Thermography—a novel tool for material and device characterization," Solid State Phenomena 82-84, pp. 741-746 (2002).

U.S. Appl. No. 14/147,785, filed Jan. 6, 2014, "Optical Measurement Method and Apparatus for Fuel Cell Components," Stephen Couse et al., Specification and drawings.

Low Cost, High Efficiency Reversible Fuel Cell (and Electrolyzer) Systems, Proceedings of the 2001 DOE Hydrogen Program Review NREL/CP-570-30535.

Fialkov et al., "Diamagnetic Susceptibility and Linear Thermal Expansion of Graphitized Carbons," Soviet Powder Metallurgy and Metal Ceramics, vol. 4, No. 8, pp. 674-680.

International Search Report, International Application No. PCT/2013/035895, Jul. 25, 2013.

* cited by examiner

| Part Number | Serialization | Current Status | Vendor | Powder Batch | Powder Press Dies | Sintering Furnace | Oxidation Furnace | Coating Company |
|---|---|---|---|---|---|---|---|---|
| 1ZA1 | 1234567 | Finished | 100 | A1 | A,B | 1 | 1 | 300 |
| 1ZA2 | 2124689 | Sintered | 100 | B2 | A,C | 2 | | |
| 1AB1 | 1517438 | Green Compact | 200 | B3 | A,B | | | |

| Part Number | Unique Surface Feature Map | Current Status | Vendor | Powder Batch | Powder Press Dies | Sintering Furnace | Oxidation Furnace | Coating Company |
|---|---|---|---|---|---|---|---|---|
| 1ZA1 | | Finished | 100 | A1 | A,B | 1 | 1 | 300 |
| 1ZA2 | | Sintered | 100 | B2 | A,C | 2 | | |

FIG. 17

SERIALIZATION OF FUEL CELL COMPONENTS

CROSS REFERENCE TO RELATED APPLICATION

This application claims the benefit of priority to U.S. Provisional Patent Application Ser. No. 61/750,179 entitled "Serialization of Fuel Cell Components" filed Jan. 8, 2013, which is incorporated herein by reference in its entirety.

BACKGROUND

The present invention relates generally to the field of fuel cell fabrication and more particularly to fuel cell part tracking methods and apparatus.

Solid oxide fuel cells ("SOFC's") are solid-state devices which use an oxygen ion conducting ceramic electrolyte to produce electrical current by transferring oxygen ions from an oxidizing gas stream at the cathode of the fuel cell to a reducing gas stream at the anode of the fuel cell. The oxidizing flow is typically air, while the fuel flow may be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks are frequently built from a multiplicity of cells in the form of planar elements, tubes, or other geometries. Fuel cell stacks, particularly those with planar geometry, often use seals between electrolyte and interconnect surfaces to contain fuel and air at various locations within the stack. The stacks are often internally manifolded for fuel and/or air flow, and the ceramic electrolyte material may include internal openings or holes to accommodate fluid flow within the stack.

The fabrication of fuel cell stacks may involve a large number of complex process steps. As examples, the manufacture of fuel cell stack components may include multiple pressing, sintering, conditioning, and coating steps. Each process step needs to be carefully designed and process interactions considered and monitored in order to create a functioning product with high yield. Each process step and its associated equipment/material may contribute to the functioning of the end product, thus tracking process steps, equipment/material, and fuel cell stack parts themselves may be key to creating a functioning product.

SUMMARY

The embodiments of the invention provide systems and methods for fuel cell stack part serialization and tracking. In an embodiment, a barcode may be applied to a fuel cell stack part which may identify the fuel cell stack part. In an embodiment, the barcode may be applied as ink on a green fuel cell stack part prior to sintering. In an embodiment, a portion of a fuel cell stack part may be imaged and pattern recognition techniques may be utilized to identify the fuel cell stack part based on the unique features of fuel cell stack part. In an embodiment, portion of a fuel cell stack part may be measured to generate one or more series of unique volume/area values and one or more series of unique volume/area values may be utilized to identify the fuel cell stack part.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 11 illustrates an example data table according to an embodiment.

FIG. 17 illustrates an example data table according to another embodiment.

DETAILED DESCRIPTION

Figure 1:
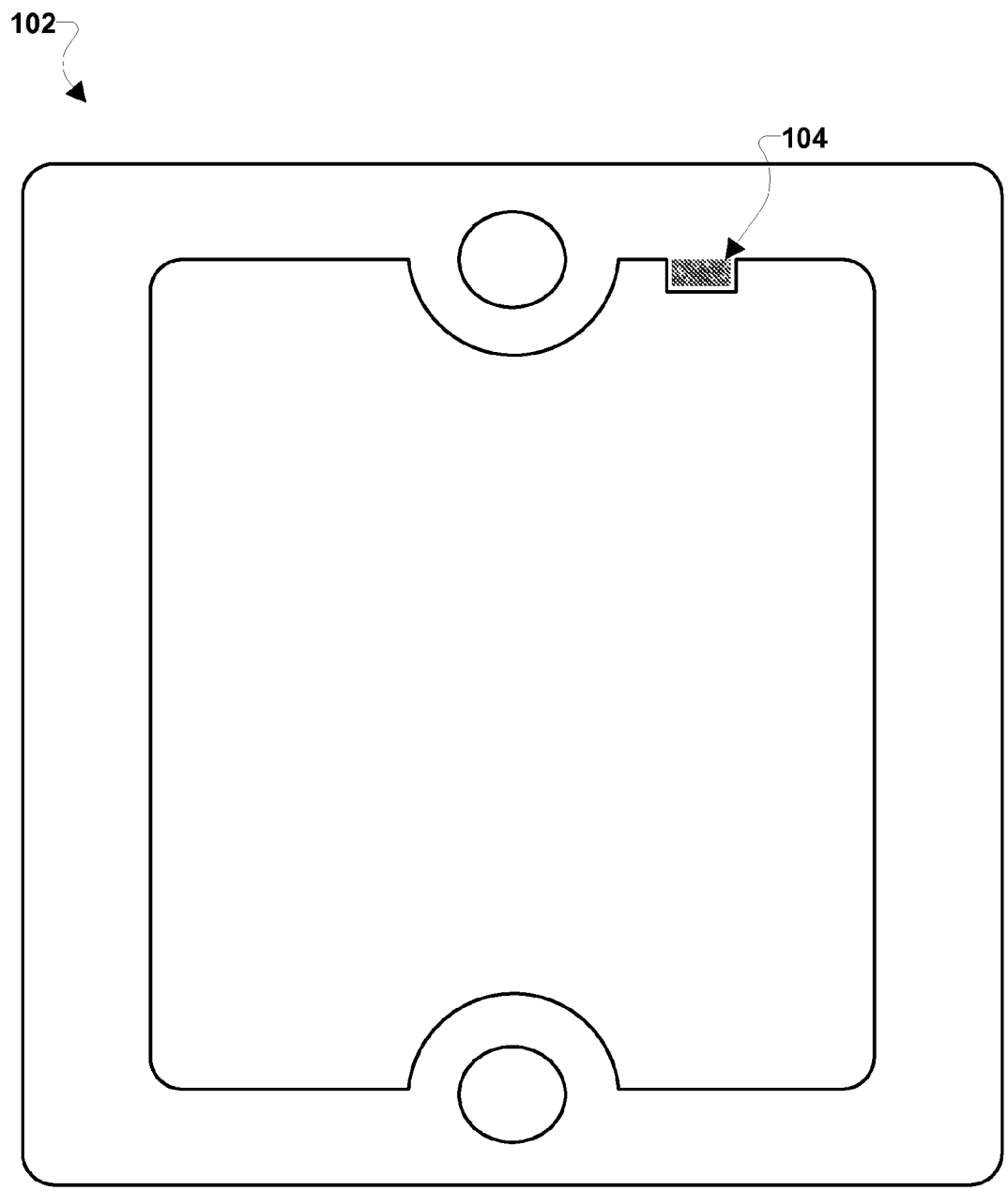
FIG. 1 illustrates a barcode on a fuel cell according to an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments provide systems and methods for fuel cell stack part serialization and tracking. In an embodiment, a barcode may be applied to a fuel cell stack part which may identify the fuel cell stack part. In an embodiment, the barcode may be applied as ink on a green fuel cell stack part prior to sintering. In an embodiment, a portion of a fuel cell stack part may be imaged and pattern recognition techniques may be utilized to identify the fuel cell stack part based on the unique features of fuel cell stack part. In an embodiment, portion of a fuel cell stack part may be measured to generate one or more series of unique volume/area values and one or more series of unique volume/area values may be utilized to identify the fuel cell stack part.

The various embodiments may enable the tracking of individual SOFC stack components (i.e., fuel cell stack parts such as interconnects, fuel cells, etc.) during and after manufacture. By tracking the individual fuel cell stack parts through their fabrication steps and tracking the equipment, and/or materials used in those fabrication steps and/or their assembly into the fuel cell stack, and/or stack disassembly for part refurbishing or failure analysis, quality control may be improved and product failures may be tracked back through the manufacturing process. The tracking of manufacturing information, such as vendor(s), powder batch(es), powder press dies, sintering furnaces, oxidation furnaces, coating quality, performance in stack, etc., related to each fuel cell stack part may enable fuel cell stack properties to be directly linked with part manufacturing and stack assembly processes. The availability of manufacturing information on a per fuel cell stack part basis may improve manufacturing process controls.

"Firing" includes processes for burnout and sintering of the binder in the ceramic electrolyte or in electrodes on the ceramic electrolyte substrate of the SOFCS in the stacks.

As used herein "green" refers to a powder formed part (e.g., dried pressed powder part containing a binder) which has not been sintered.

Many fuel cell stack parts (e.g., an interconnect, fuel cell, etc.) may be fabricated by pressing powder to form a green fuel cell stack part. As an example, interconnects may be fabricated by pressing a chromium rich powder to form a green interconnect. This green interconnect may be sintered, cleaned, oxidized and coated with one or more layers to form the completed interconnect. As another example, a fuel cell may be formed in a similar manner by pressing a stabilized zirconia or doped ceria (e.g., SSZ or SDC) powder to form a green fuel cell electrolyte. This green fuel cell may be sintered to form the completed fuel cell electrolyte.

Completed individual fuel cell stack parts (e.g., completed fuel cell(s), completed interconnect(s), and other components) may be assembled together to form fuel cell stacks.

With regard to assembly of completed fuel cell stack parts into a fuel cell stack "sintering" includes processes for heating, melting, and/or reflowing glass or glass-ceramic seal precursor material(s), such as glass or glass-ceramic forming powders and/or glass or glass-ceramic layers in the stack to form the glass or glass-ceramic seals between a fuel cell and two adjacent interconnects in the stack. Sintering may be performed at temperatures greater than 600 degrees Celsius, such as 600-1000 degrees Celsius, including 700-800 degrees Celsius, 800-900 degrees Celsius, 700-900 degrees Celsius, 900-950 degrees Celsius, and/or 950-1000 degrees Celsius.

With regard to assembly of completed fuel cell stack parts into a fuel cell stack "conditioning" includes processes in which the fuel cell (e.g., SOFC) stack may be operated to generate power for the first time. Conditioning may include processes for heat up of the fuel cell stack at a controlled rate, reducing a metal oxide (e.g., nickel oxide) in an anode electrode to a metal (e.g., nickel) in a cermet electrode (e.g., Ni-zirconia electrode, such as Ni-yttria stabilized zirconia and/or Ni-scandia stabilized zirconia electrode, or Ni-doped ceria (e.g., scandia doped ceria) anode), characterization and/or testing during operation, and/or controlled cool down. Conditioning may be performed at temperatures from 750-900 degrees Celsius, such as 800-850 degrees Celsius, and may be performed with fuel and air flowing to anodes and cathodes. Conditioning may be utilized to reduce the anode, characterize the anode, electrically characterize each cell, and/or screen out stacks with known failure modes (e.g., cracked cells, leaking seals, poor fuel utilization, and/or uneven flow distribution). The sintering and conditioning processes may be conducted independently, in succession, or in any order. Preferably, the sintering and conditioning is performed on a fuel cell (e.g., SOFC) stack which is supported on the same support structure during both sintering and conditioning. These steps may be performed in a furnace, in the fuel cell system hot box, or in a different location. Additionally, the sintering and/or conditioning processes may be optional and not required for any given fuel cell stack.

In an embodiment, a fuel cell stack part (e.g., an interconnect, fuel cell, etc.) may be tracked by a serialization applied to the green fuel cell stack part. The serialization may be a unique identifier associated with the fuel cell stack part and used to identify the fuel cell stack part. In an embodiment, a serialization may be an encoding of information. In an embodiment, the serialization may be a barcode. The barcode may be any type barcode, such as a one dimensional/linear barcode or a multi-dimensional barcode (e.g., a QR code). In another embodiment, the serialization may be a combination of a barcode and other information, such as a serial number.

In an embodiment, the serialization may be applied to the green fuel cell stack part by printing ink onto the green fuel cell stack part. As an example, a barcode may be inkjet printed on a fuel cell or interconnect. The ink used to print the serialization may be an ink which is tolerant to 1250 degrees Celsius, more than 1250 degrees Celsius, 1400 degrees Celsius, or more than 1400 degrees Celsius. In an embodiment, the ink may comprise titanium oxide ($TiO_2$) and/or iron manganese oxide. The composition of the ink may be selected based on the color of the fuel cell stack part to which it is applied. As examples, titanium oxide may be a light or white colored ink which may be used to print on darker interconnects and iron manganese oxide may be a dark colored ink which may be used to print on lighter colored ceramic fuel cells. In an embodiment, the ink printed onto the fuel cell part surface may diffuse into the fuel cell part surface during sintering or firing and create a permanent marking of the fuel cell part. As an example, a barcode inkjet printed on a green fuel cell may diffuse into the electrolyte surface during firing thereby creating a permanent marking of the barcode on the fuel cell surface.

FIG. 1 illustrates a fuel cell 102 according to an embodiment in which a two dimensional barcode 104 is printed on a surface of the fuel cell 102.

Figure 2:
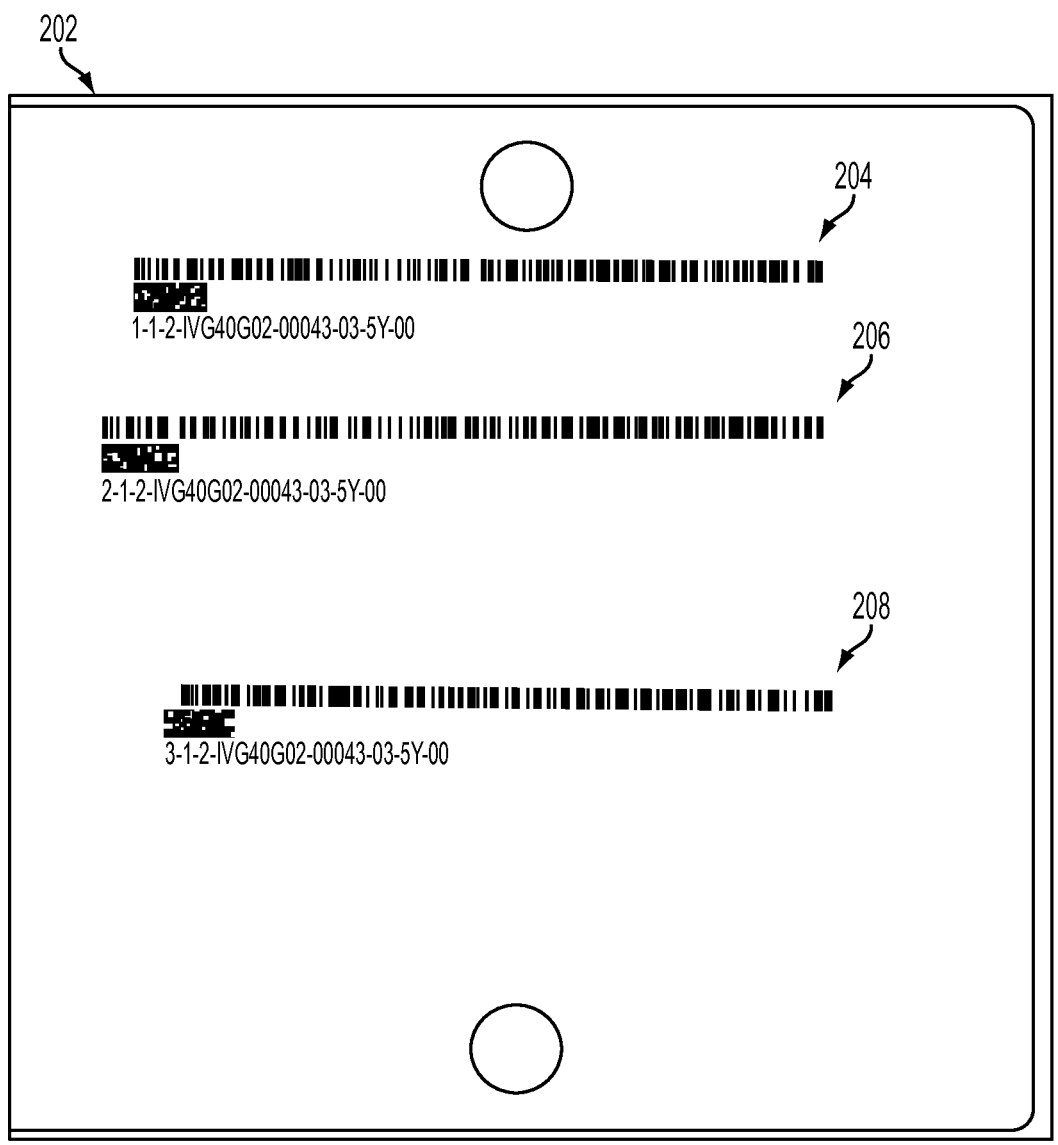
FIG. 2 illustrates barcodes printed on electrolyte tape.
Figure 3:
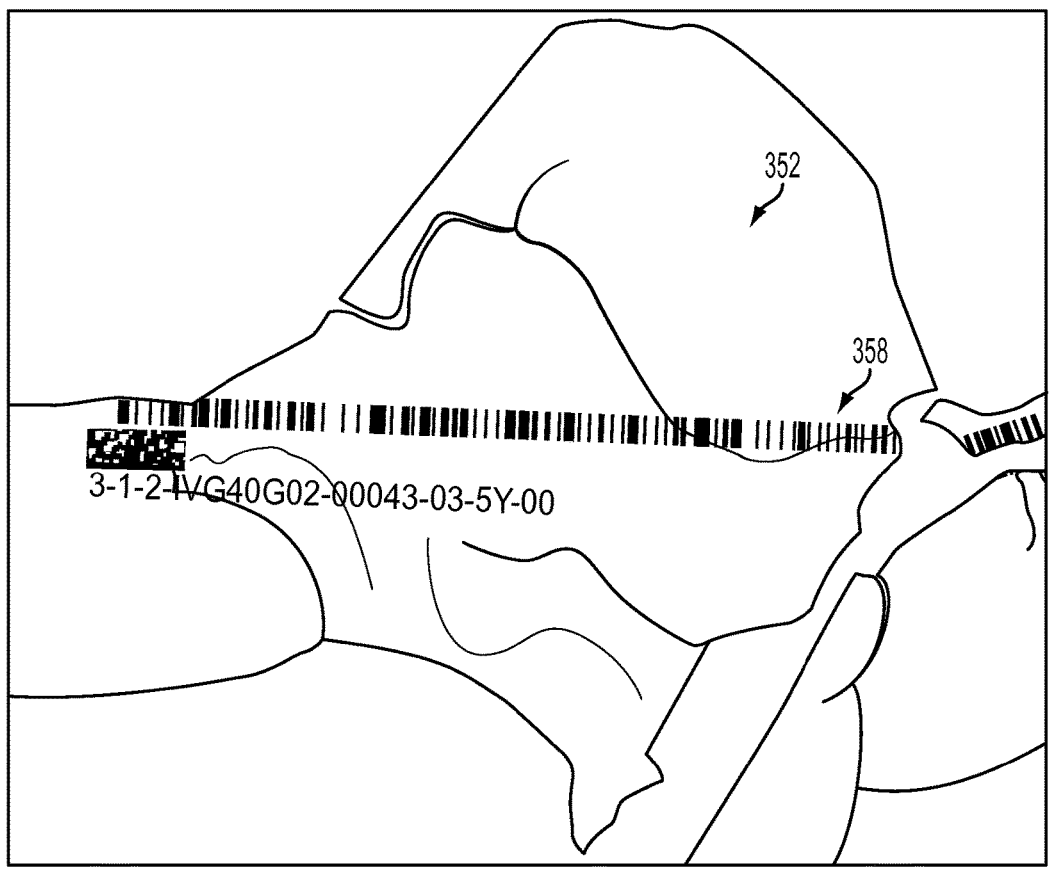
FIG. 3 illustrates another barcode printed on electrolyte tape.
Figure 4:
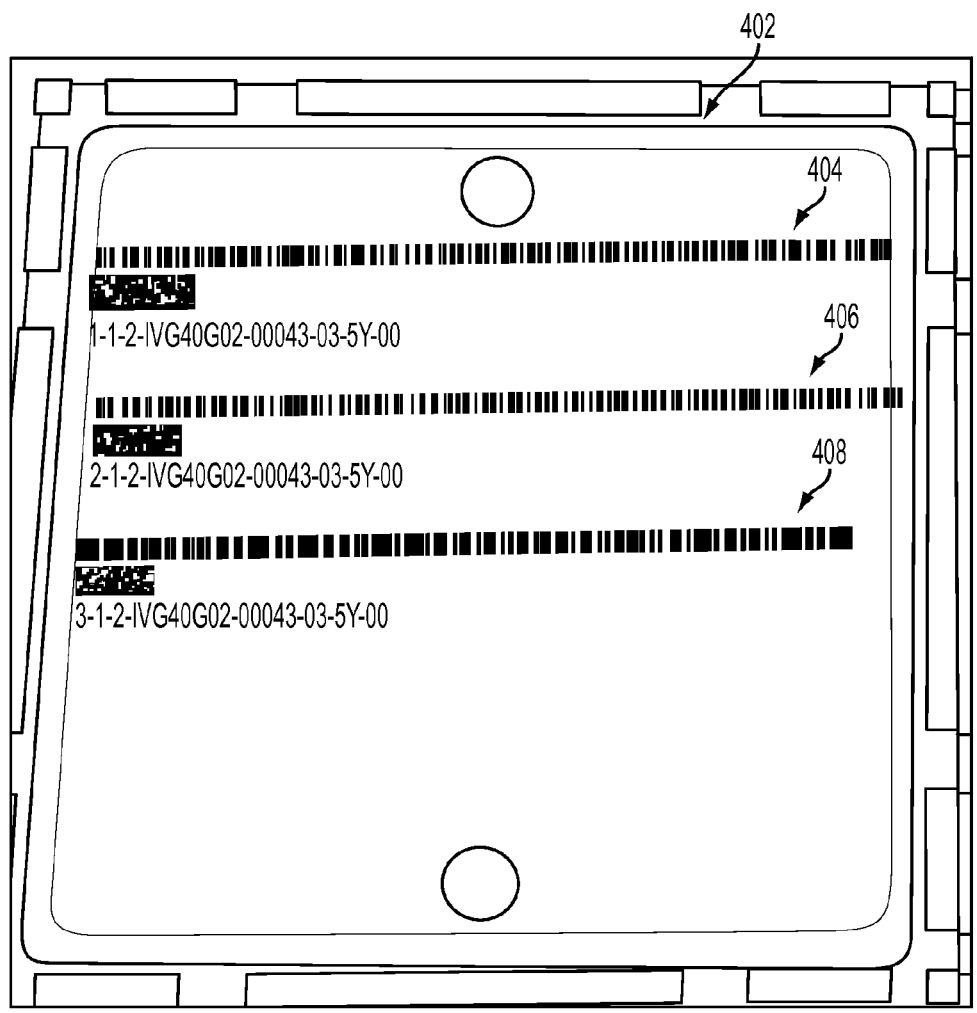
FIGS. 4-5 illustrate fuel cells printed with barcodes.
Figure 5:
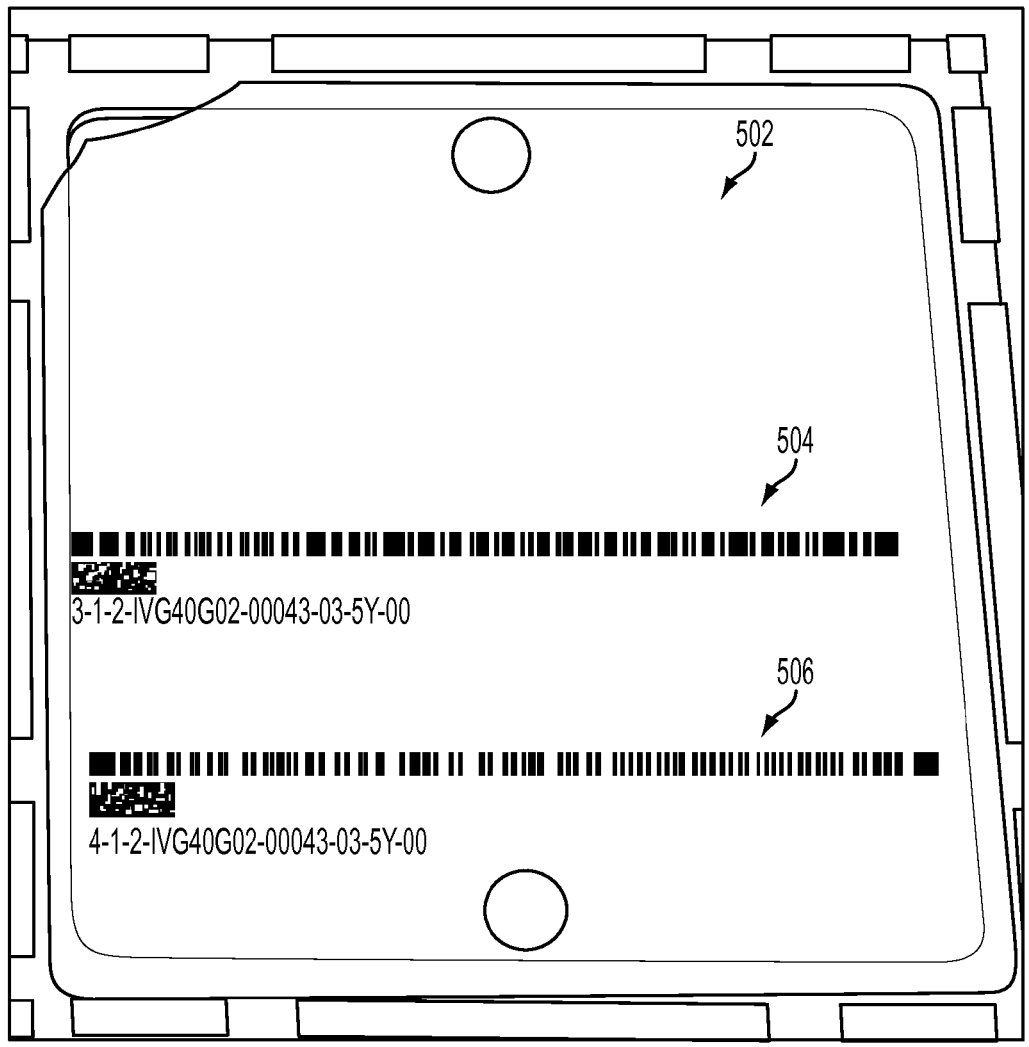

FIG. 2 illustrates a fuel cell 202 on which three barcodes 204, 206, and 208 were printed on electrolyte tape. As illustrated in FIG. 2, the barcodes 204, 206, and 208 may be a combination of one dimensional barcodes, multi-dimensional barcodes, and other symbols such as letters and numbers. FIG. 3 illustrates a close up view of an electrolyte tape 352 on which a barcode 358 may be printed. FIG. 3 illustrates that electrolyte tape 352 may be subject to cracking during the harsh fabrication processes which may damage the barcode 358. FIG. 4 illustrates a sintered fuel cell 402 printed with three barcodes 404, 406, and 408. FIG. 5 illustrates two examples of barcodes 504 and 506 printed on a sintered fuel cell 502.

Figure 6:
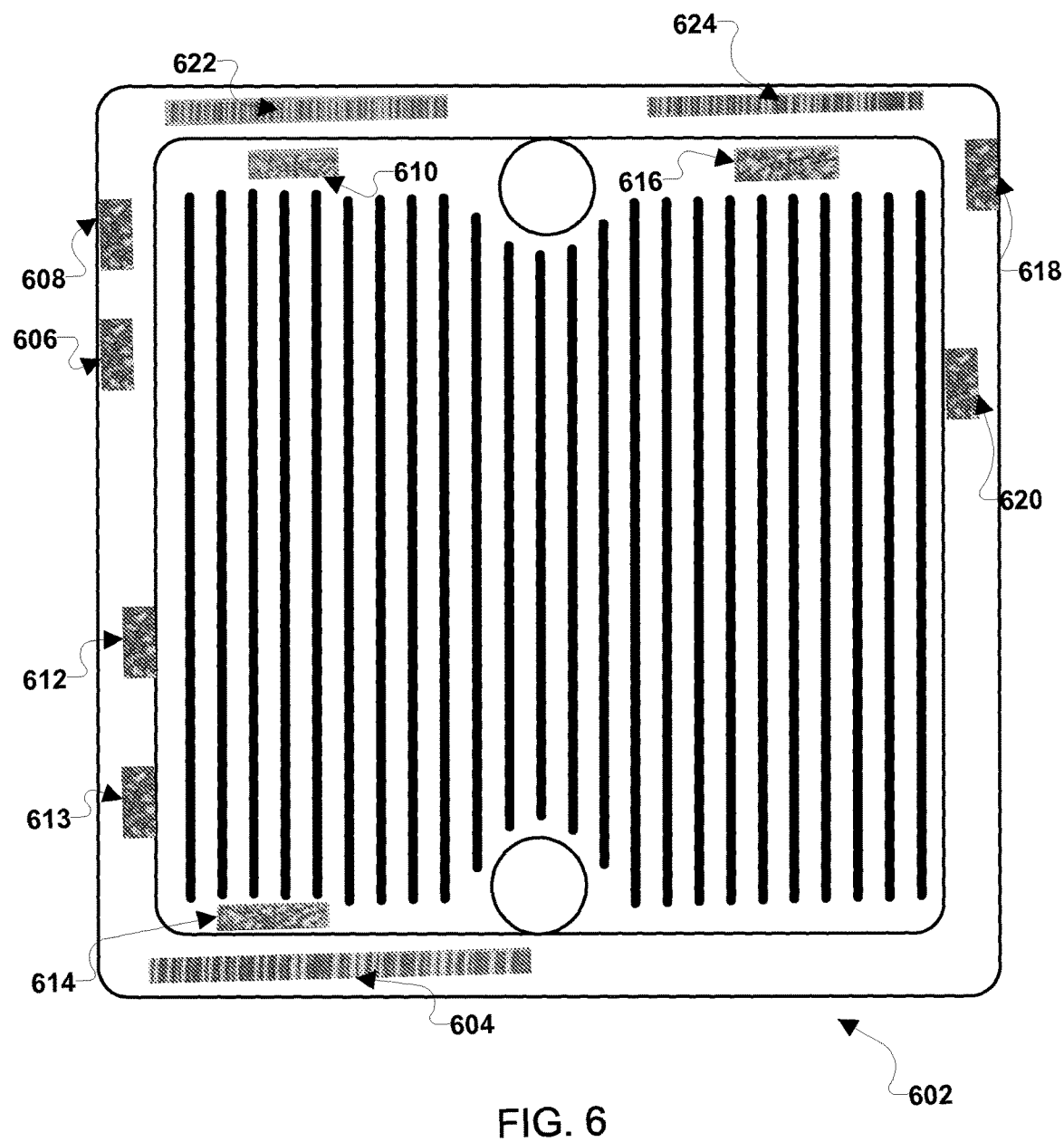
FIGS. 6, 7, 8A, 8B, 8C illustrate interconnects printed with barcodes.
Figure 7:
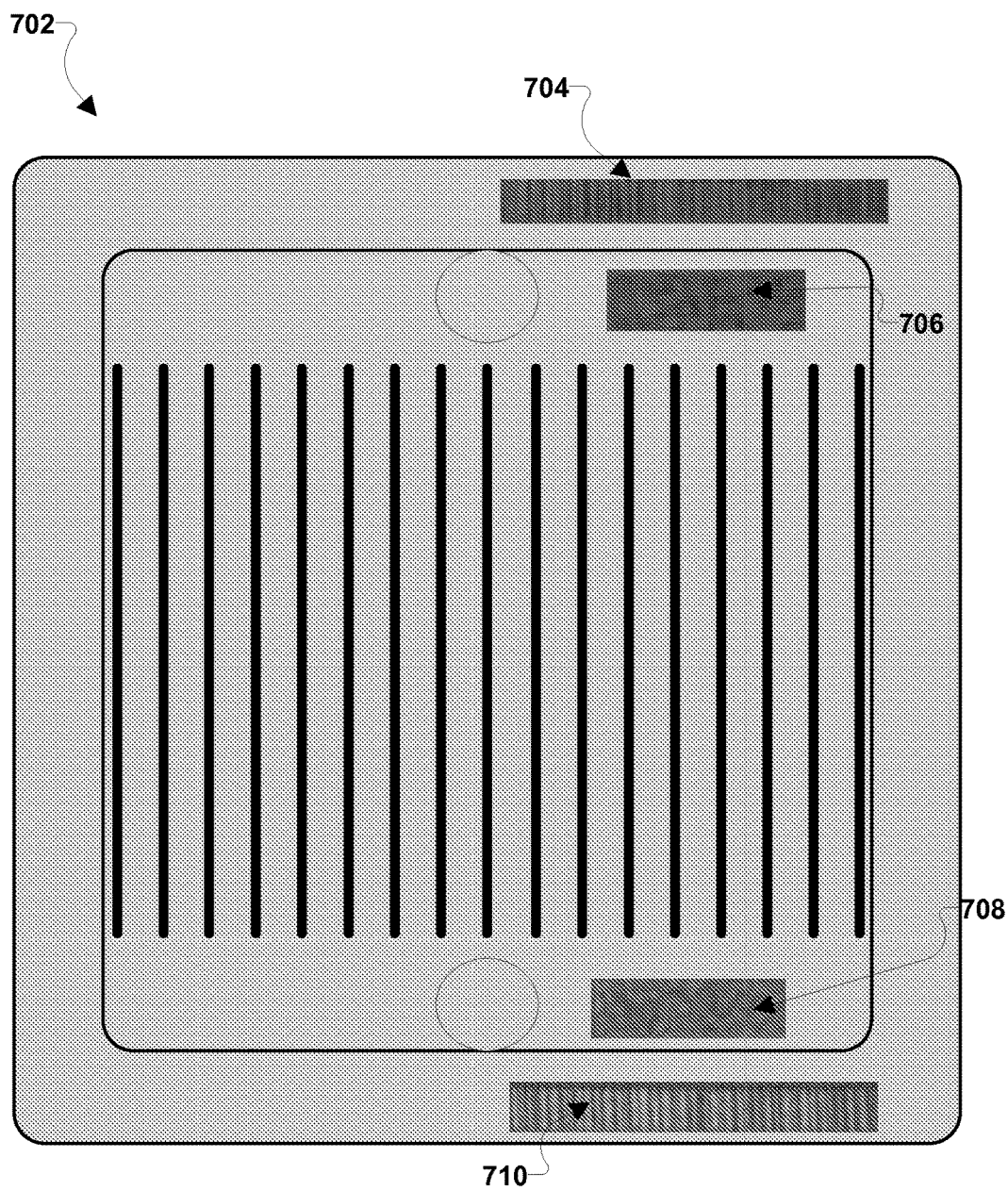

FIG. 6 illustrates an interconnect 602 on which multiple barcodes 604, 606, 608, 610, 612, 613, 614, 616, 618, 620, 622, and 624 are printed. FIG. 6 illustrates the various locations on which barcodes may be printed on the interconnect 602. Good candidates for location of the barcodes 610, 616, 614 printed on the interconnect 602 include the fuel plenum (i.e., the channel between the riser opening and the flow channels) since it has no contact with adjacent components. Barcodes 604, 613, 612, 606, 608, 622, 624, 618, and 620 may also be printed on the periphery of the interconnect 602, such as in seal locations on the fuel and/or air side of the interconnect 602. FIG. 7 illustrates another interconnect 702 on which barcodes 704, 706, 708, and 710 are printed. FIG. 7 illustrates the contrast of color between the barcodes 707, 706, 708, and 710 and the interconnect 702 which may be achieved by selecting different inks. As an example, the barcodes printed in one ink, such as barcodes 704 and 706, may have a color that contrasts differently with the interconnect than barcodes printed with a different ink, such as barcodes 708 and 710, of another color.

Figure 8A:
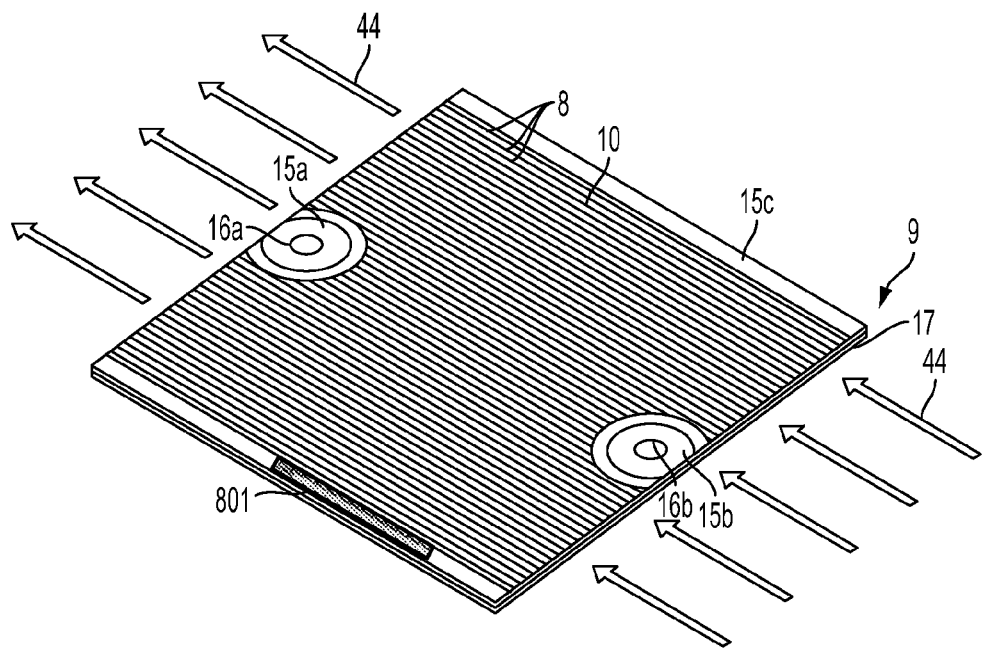
Figure 8B:
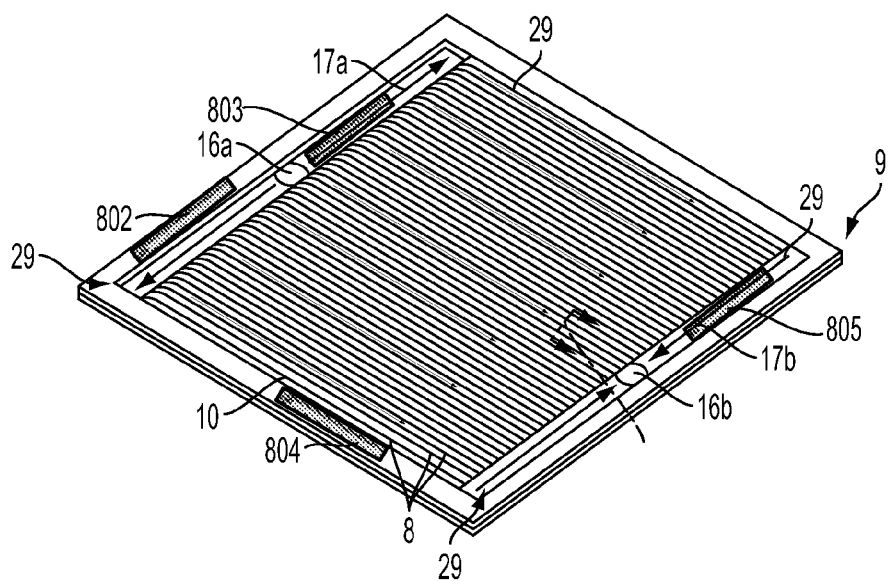
Figure 8C:
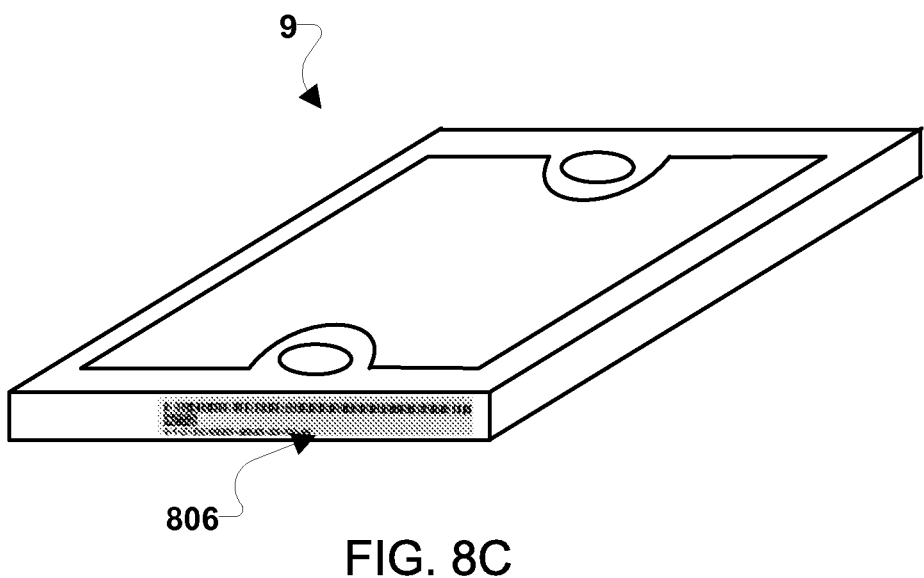

FIGS. 8A, 8B, and 8C show, respectively, top, bottom, and side views of an interconnect 9. The interconnect 9 contains gas flow passages or channels 8 between ribs 10. The interconnect 9 in this embodiment includes at least one riser channel 16a for providing fuel to the anode-side of the SOFC, as illustrated by arrow 29. The riser channel 16a generally comprises a fuel inlet riser opening or hole that extends through at least one layer of the fuel cells and interconnects in the stack. As illustrated in FIG. 8B, the fuel can flow through the inlet riser channel 16a to the anode-side of each fuel cell. There, the fuel can collect in an inlet plenum 17a (e.g., a groove in the interconnect's surface), then flow over the fuel cell anode 3 through gas flow channels 8 formed in the interconnect 9 to an outlet plenum 17b and then exit through a separate outlet riser channel 16b.

The cathode side, illustrated in FIG. 8A, can include gas flow passages or channels 8 between ribs 10 which direct air flow 44 over the cathode electrode of the fuel cell. Seals 15a, 15b can seal the respective risers 16a, 16b on the cathode-sides of the interconnect and fuel cell to prevent fuel from reaching the cathode electrode of the fuel cell. The seals may have a donut or hollow cylinder shape as shown so that the risers 16a, 16b extend through the hollow middle part of the respective seals 15a, 15b. The seals 15a, 15b can include a elevated top surface for contacting against the flat surface of the adjacent SOFC. A peripheral seal 15c can seal the anode-sides of the interconnect and fuel cell to prevent air from reaching the anode electrode of the fuel cell.

In FIGS. 8A and 8B, the riser channel openings 16a, 16b are shown as fuel inlet and fuel outlet openings in the interconnect 9. This interconnect is configured for a fuel cell stack which is internally manifolded for fuel, in which the fuel travels through the stack through fuel riser channels which are formed by mated openings through the stacked interconnects and fuel cells. However, if desired, the interconnect 9 may be configured for a stack which is externally manifolded for fuel. In this case, the top and bottom edges of the interconnect 9 shown in FIG. 8B would function as fuel inlet and outlet, respectively, for the fuel which flows externally to the stack. Furthermore, the interconnect 9 shown in FIGS. 8A and 8B is configured for a stack which is externally manifolded for air. However, additional openings through the interconnect may be formed, such as on the left and right sides of the interconnect, for the interconnect to be configured for a stack which is internally manifolded for air.

FIG. 8A further illustrates that, on the cathode side, a barcode 801 may be printed below the peripheral seal 15c on the interconnect 9. FIG. 8B illustrates that, on the anode side, a barcode 802 may be printed the peripheral side area of the interconnect 9 under the seal, a barcode 803 may be printed on the inlet plenum 17A, a barcode 804 may be printed on the peripheral end area of the interconnect 9 under the seal, and/or a barcode 805 may be printed on the outlet plenum 17B. FIG. 8C illustrates a side view of interconnect 9 in which the barcode 806 may be printed on the side surface (i.e., minor surface) of the plate shaped interconnect 9. In this manner, the barcode 806 may be visible from the outside of a completed fuel cell stack into which the interconnect 9 may be installed.

Figure 9:
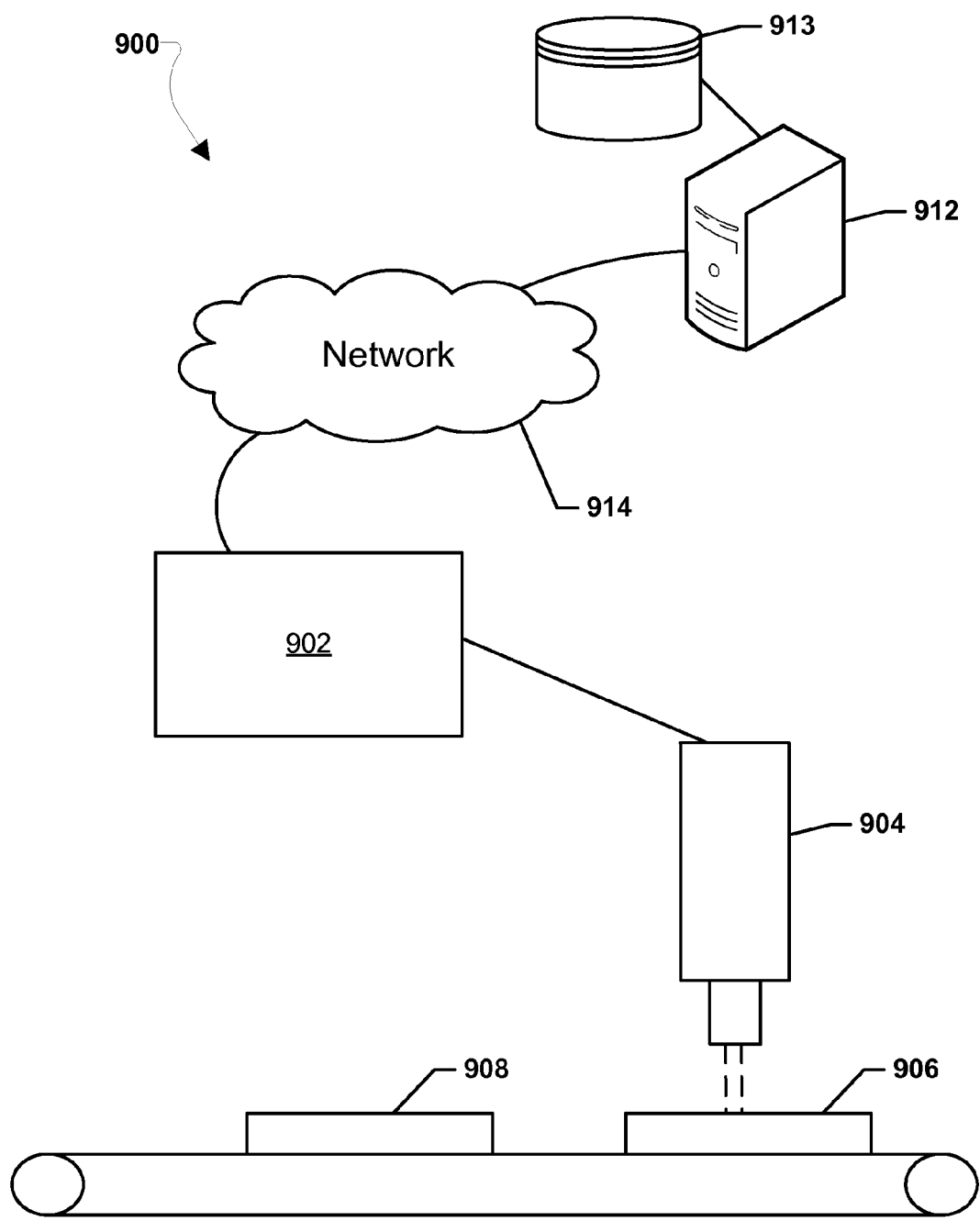
FIG. 9 illustrates a part tracking system according to an embodiment.

FIG. 9 illustrates an embodiment system 900 for tracking fuel cell stack parts (e.g., interconnects, fuel cells, etc.) 906 and 908. In an embodiment, system 900 may be a part tracking system installed in a fuel cell component manufacturing facility and/or a fuel cell stack assembly or disassembly facility. The system 900 may include a barcode reader 904 connected to a controller/processor 902. The barcode reader 904 may be any type barcode reader, such as a barcode scanner, barcode imager, etc. The controller/processor 902 may connect wirelessly or be wired to a network 914, such as the Internet or a factory intranet. A part tracking server 912 managing a part tracking database 913 may be connected wirelessly or be wired to the network 914, and via the network the controller/processor 902 and part tracking server 912 may exchange data. In operation, a serialization (e.g., a barcode) of a fuel cell stack part 906 may be scanned by the barcode reader 904 and the controller/processor 902 may read the information in the serialization and provide the serialization information and other information to the part tracking server 912. In turn, the part tracking server 912 may identify the fuel cell stack part corresponding to the serialization and update the part tracking database 913 accordingly. In an embodiment, controller/processor 902 and the part tracking server 912 may be the same controller/processor/server.

Figure 10:
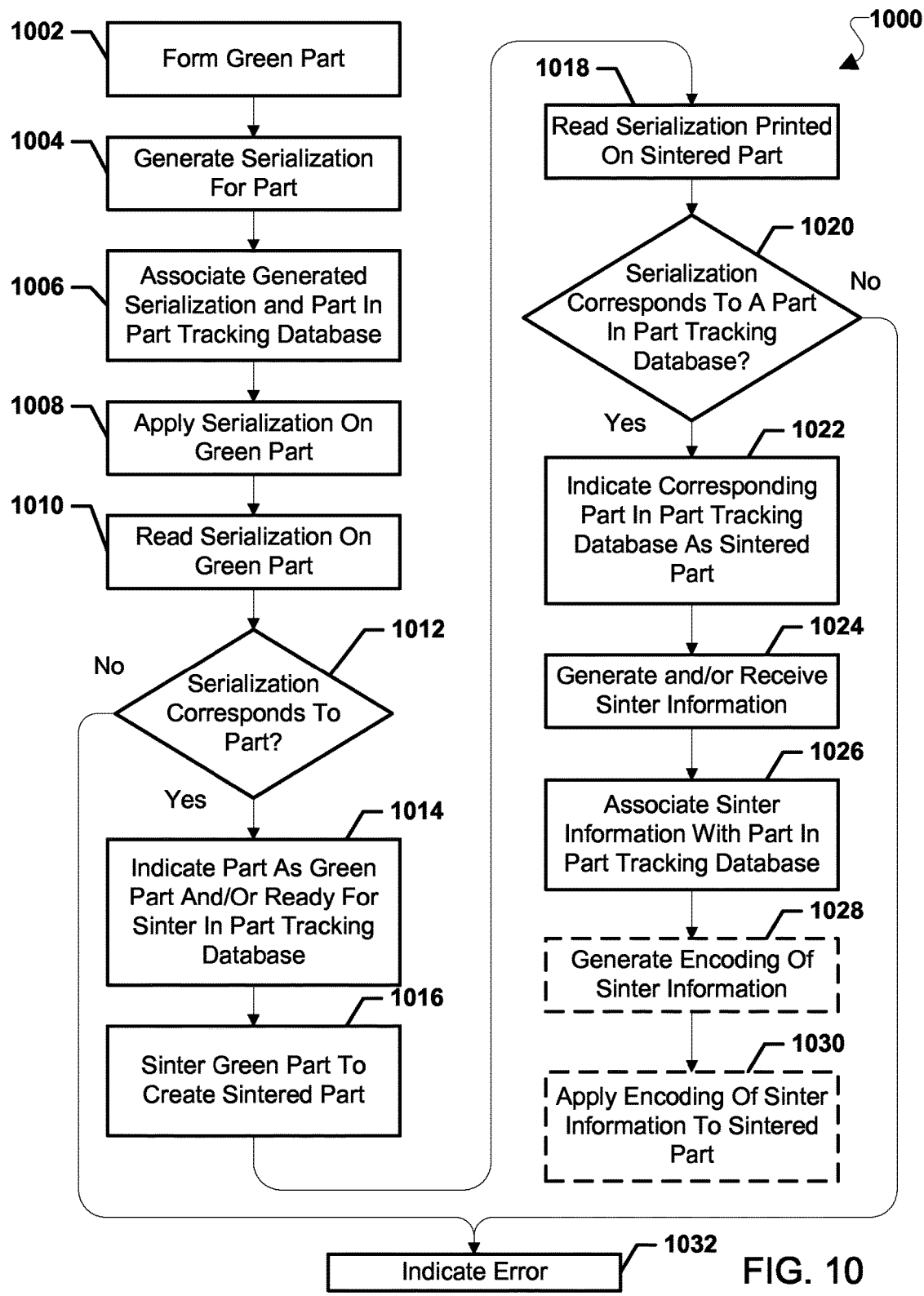
FIG. 10 is a process flow diagram illustrating an embodiment method for part tracking.

FIG. 10 illustrates an embodiment method 1000 for tracking a fuel cell stack part. In block 1002 a green part may be formed. As an example, a green part may be pressed but unsintered metal interconnect or ceramic fuel cell. In block 1004 a serialization for the fuel cell stack part may be generated. In an embodiment, the serialization may be a unique barcode generated by a part tracking system controller/processor or server (e.g., controller/processor 902 or part tracking server 912 described above) to identify a fuel cell stack part. In block 1006 the generated serialization and the fuel cell stack part may be associated in a part tracking database. As an example, a part ID may be correlated with a barcode value in a data table resident in the part tracking database (e.g., part tracking database 913 described above). In block 1008 the serialization may be applied to the green fuel cell stack part. In an embodiment, the serialization may be a barcode and the barcode may be inkjet printed onto a surface of the green fuel cell stack part. As discussed above, the barcode may be a single dimension barcode, a multi-dimension barcode, or combinations of the two. In block 1010 the serialization on the green fuel cell stack part may be read, for example by a barcode reader (e.g., barcode reader 904 described above). In reading the serialization on the green fuel cell stack part, a barcode reader (e.g., barcode reader 904 described above) and controller/processor (e.g., controller/processor 902 described above) may decode the information in the serialization and provide an indication of the serialization to a part tracking server managing the part tracking database. In determination block 1012 the part tracking server may determine whether the serialization corresponds to the fuel cell stack part. If the serialization does not correspond (i.e., determination block 1012="No"), a problem may exist with the barcode and in block 1032 the part tracking server may indicate an error with the fuel cell stack part. In this manner, invalid barcodes may be identified before further manufacture operations occur.

If the serialization does correspond to the fuel cell stack part (i.e., determination block 1012="Yes"), in block 1014 the part tracking server may update the part tracking database to update a status of the fuel cell stack part as a green part and/or ready for sintering. In block 1016 the green fuel cell stack part may be sintered to create a sintered fuel cell stack part. In block 1018 the serialization on the sintered fuel cell stack part may be read, for example by a barcode reader (e.g., barcode reader 904 described above or a different barcode reader). In reading the serialization on the sintered fuel cell stack part, a barcode reader and controller/processor may decode the information in the serialization and provide an indication of the serialization to a part tracking server managing the part tracking database. In determination block 1020 the part tracking server may determine whether the serialization corresponds to a part in the part tracking database. If the serialization does not match (i.e., determination block 1020="No"), in block 1032 an error may be indicated.

If the serialization does match a part in the part tracking database (i.e., determination block 1020="Yes"), in block 1022 the part tracking server may indicate the corresponding part in the part tracking database as the sintered part. In this manner, the status of the fuel cell stack part may be updated in the part tracking database based on the identified serialization. In block 1024 the part tracking server may generate and/or receive sinter information. In an embodiment, sinter information may be information related to the sintering of the fuel cell stack part, such as sintering time, temperature, sintering furnace used, supervising technician, etc. In block 1026 the part tracking server may associate the sinter information with the record of the fuel cell stack part stored in the part tracking database.

In an optional embodiment, in optional block 1028 the sintering information may be encoded and in optional block 1030 the encoded sintering information may be applied to the sintered part. In this manner, information may be stored on the part itself as well as in the part tracking database.

In an embodiment, the barcode on the fuel cell stack part may be used during fuel cell stack assembly to track parts assembled into the fuel cell stack and part performance. In an embodiment, the barcode on the fuel cell stack part may be used during fuel cell stack disassembly to track part removal from the fuel cell stack and track part failure information and/or track parts for refurbishment. In another embodiment, rather than printing the barcode on the green part followed by sintering, the barcode made be printed on the sintered (i.e., fired) part (e.g., interconnect or fuel cell) using the high temperature tolerant ink described above.

FIG. 11 illustrates an example data table 1100 which may reside in a part tracking database according to an embodiment. The data table 1100 may correlate part numbers 1102 for fuel cell stack parts with an applied serialization 1104 (e.g., a barcode value), a current status of the part 1106, the vendor number 1108 of the vendor providing the part, the powder batch 1110 used in forming the part, the powder press dies 1112 used to form the green part, the sintering furnace 1114 used, oxidation furnace 1116, and/or coating company 118 used. The various fields of the data table 1100 may be updated as fuel cell stack parts move through the manufacturing, assembly, and/or disassembly process by matching the serialization on the part with the serialization 1104 in the data table 1100.

In another embodiment, a fuel cell stack part (e.g., an interconnect, fuel cell, etc.) may be tracked by mapping characteristic surface features of the fuel cell stack part that differ for each part and searching for matching surface features in a part tracking database. In an embodiment, an image of a portion of the fuel cell stack part may be used to generate a surface feature map of the portion of the fuel cell stack. In an embodiment, the surface feature map may be a particle map. The particle map may be a map of features visible under a microscope left behind from the original location of the powder particles after sintering of the powder particles of the fuel cell stack part, such as light areas, dark areas, ridges, cracks, low areas, high areas, etc. The surface feature map of the portion of the fuel cell stack may include key features of the fuel cell stack part that may remain throughout the manufacturing process once the relative position of the features is known. In this manner, the surface feature map may be used as a sort of "fingerprint" for the fuel cell stack part. In an embodiment, the fuel cell stack part to be tracked (e.g., an interconnect or fuel cell), may be placed under a microscope, and imaged with a fixed magnification and repeatable illumination. In an embodiment, the part may also be positioned relative to a datum (e.g., alignment mark) to ensure the same portion of the part is imaged each time. Image analysis of the imaged portion of the part may identify the key features of the part and these key features and/or the image of the portion may be stored in the part tracking database. As the part moves through the manufacturing, stack assembly, or disassembly process, subsequent images of the part may be taken and compared to the images and/or key features in the part tracking database to uniquely identify the fuel cell stack part. In this manner, a fuel cell stack part may be tracked based on the natural variation of the surface features of the part which may be sufficient to differentiate parts without needing additional marks (e.g., barcodes) to be placed on the part. The tracking of the natural variation of the part may be beneficial because markers which may impede part performance or which may be damaged by process conditions need not be used.

Figure 12A:
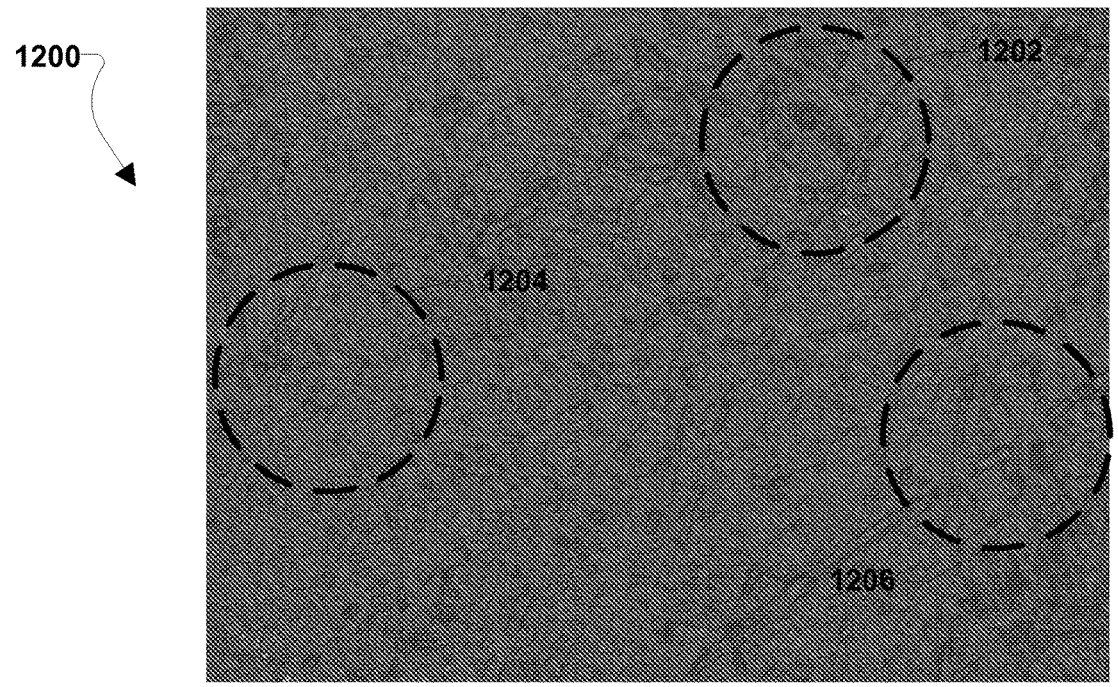
FIGS. 12A and 12B illustrate images of a fuel cell.
Figure 12B:
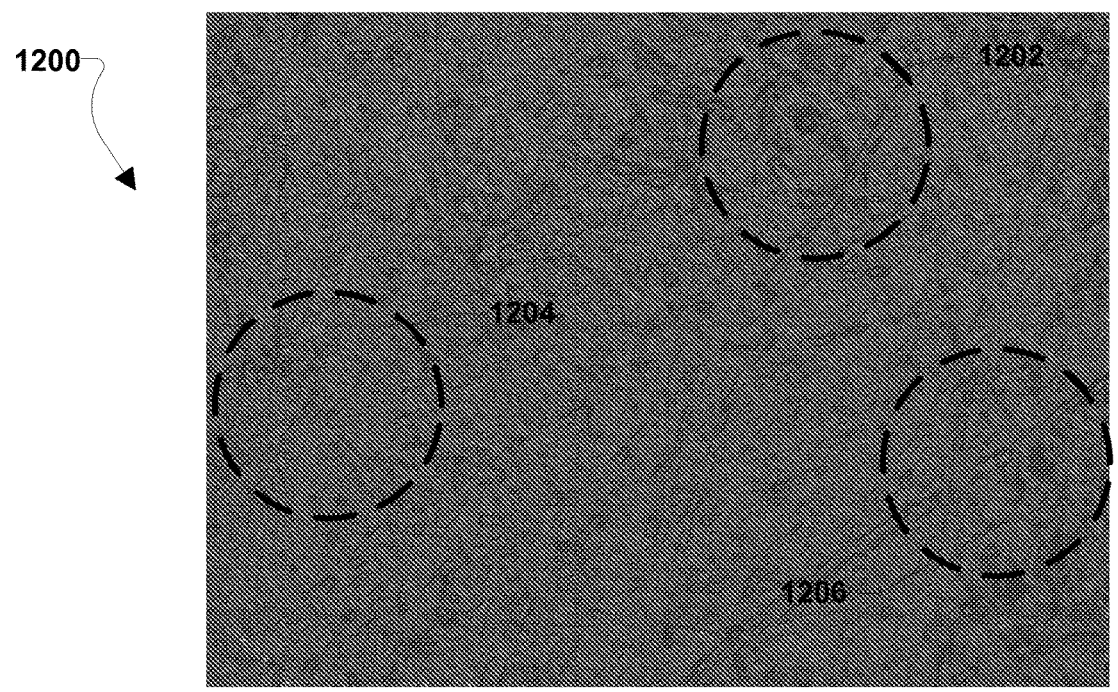
Figure 13:
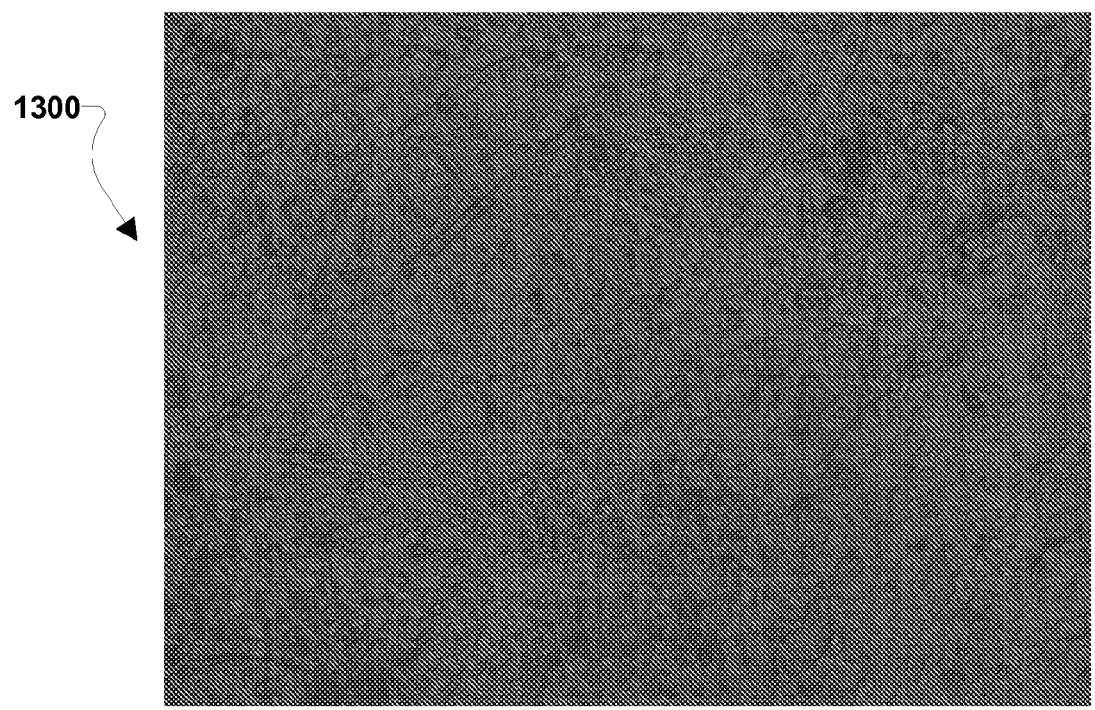
FIG. 13 illustrates an image of another fuel cell.

FIGS. 12A and 12B illustrate an example of key features 1202, 1204, and 1206 of a fuel cell electrolyte surface region 1200 which may remain constant across manufacturing operations. FIG. 12A illustrates the fuel cell electrolyte surface region 1200 at an initial time and FIG. 12B illustrates the fuel cell electrolyte surface region 1200 at a later time. FIGS. 12A and 12B illustrate that the key features 1202, 1204, and 1206 may be identifiable both before and after the manufacturing, stack assembly, or stack disassembly process which may enable the fuel cell electrolyte surface region 1200 to be identified based on the key features 1202, 1204, and 1206. FIG. 13 illustrates another fuel cell electrolyte surface region 1300, different from fuel cell electrolyte surface region 1200 illustrated in FIGS. 12A and 12B. FIG. 13 illustrates that fuel cell electrolyte surface region 1300 does not include the key features 1202, 1204, and 1206 unique to fuel cell electrolyte surface region 1200 in the same surface region location as the first fuel cell electrolyte.

Figure 14A:
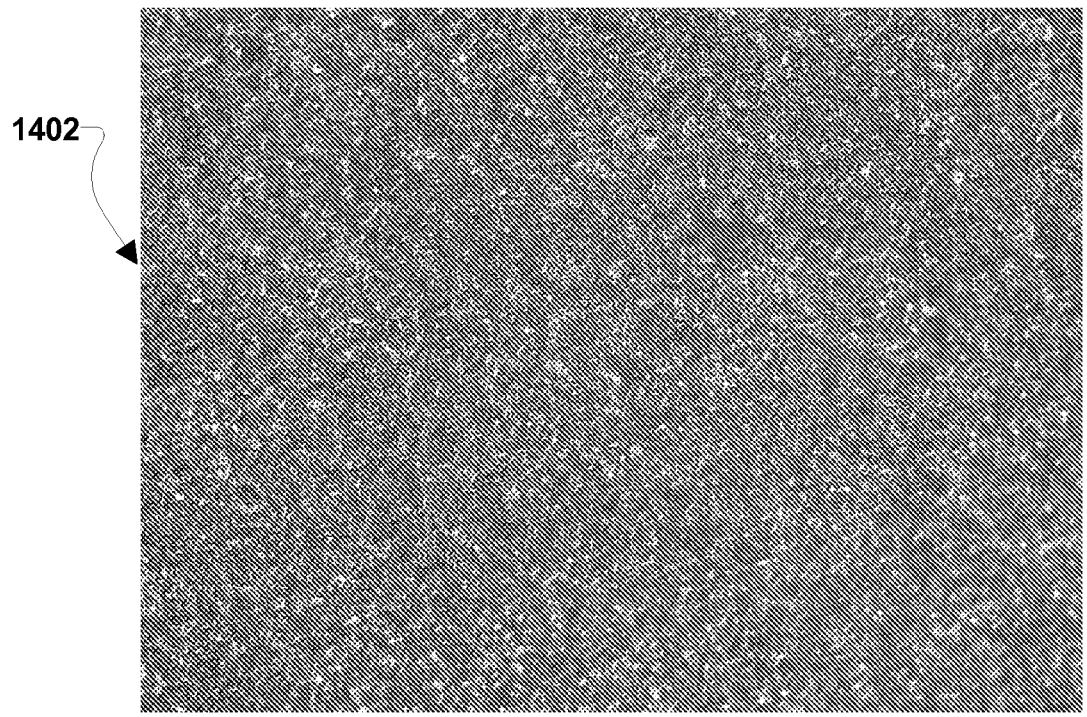
FIGS. 14A and 14B illustrate images of interconnects.
Figure 14B:
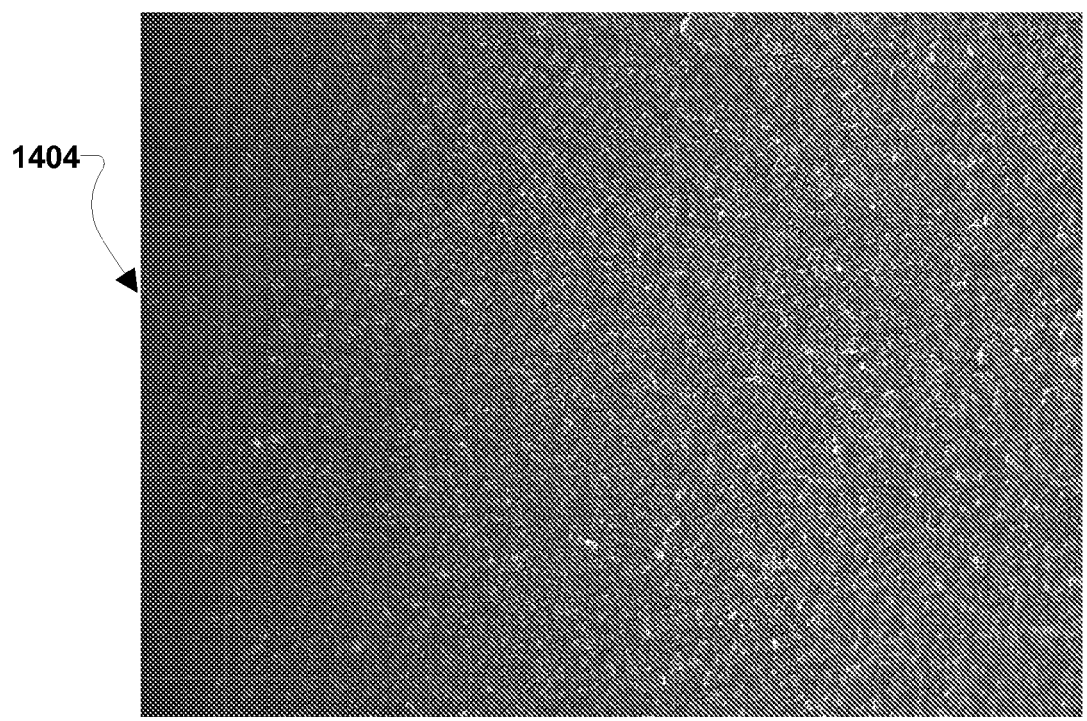

FIG. 14A illustrates a first interconnect 1402 and FIG. 14B illustrates a second different interconnect 1404. As illustrated in FIGS. 14A and 14B interconnect 1402 and interconnect 1404 include different key features in the same locations.

While discussed above as imaging a top or bottom surface of interconnects and fuel cell electrolytes, edge portions of fuel cell stack parts may also be imaged in a similar manner to identify and track the fuel cell stack parts through the manufacturing, stack assembly, and stack disassembly, by the unique surface features of the edge portions. The imaging of natural features of the part may use a visible light, infrared and/or ultraviolet image of the part features. Alternatively, a surface profilometer (mechanical or optical) may be used to measure a piece of surface topography or microtopography instead of or in addition to the VIS, IR and/or UV radiation imaging. Alternatively, material mapping (e.g., iron distribution near the surface of the part) may also be used for serialization of the parts in addition to or instead of the methods described above.

Figure 15:
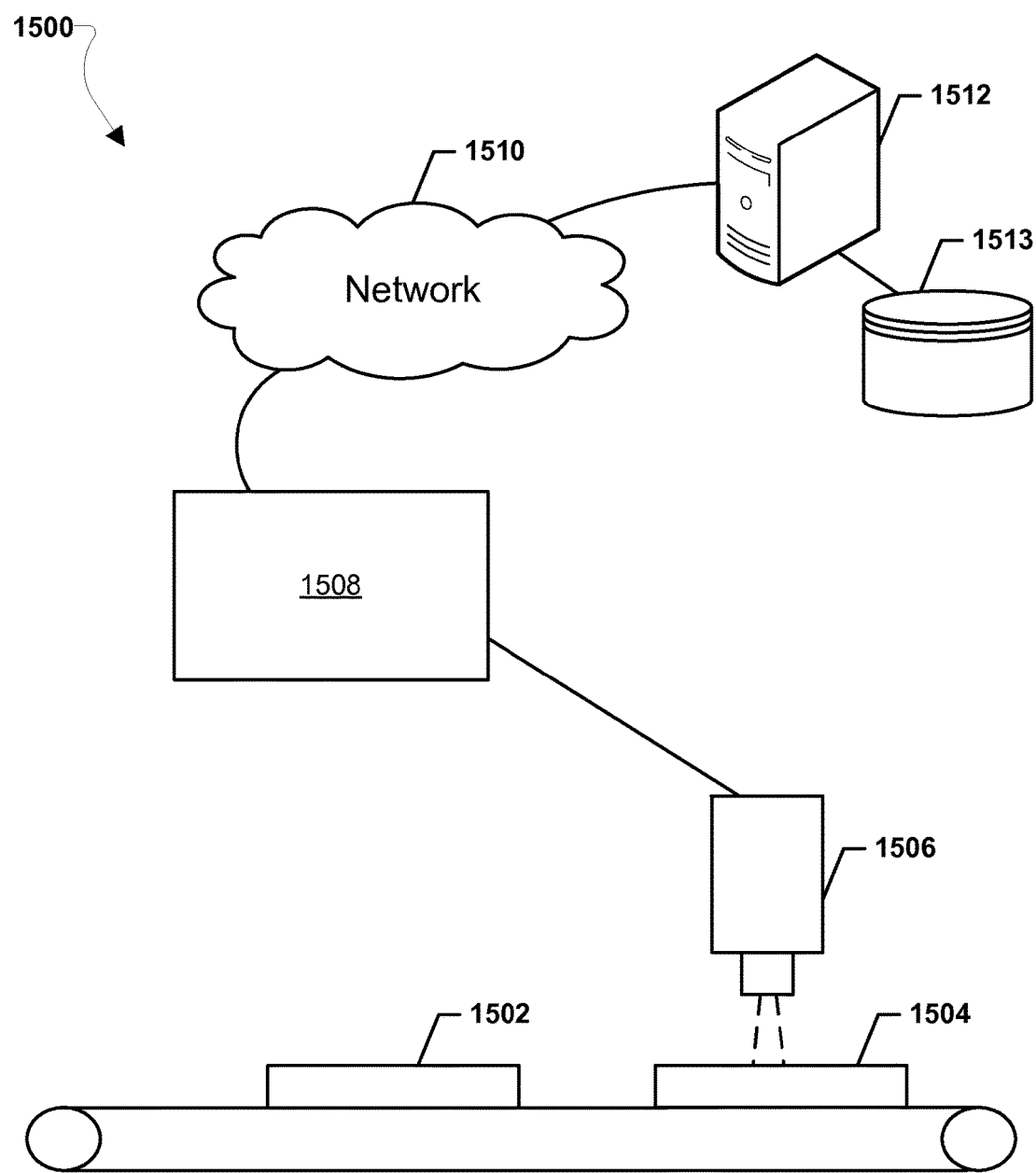
FIG. 15 illustrates a second part tracking system according to an embodiment.

FIG. 15 illustrates an embodiment system 1500 for tracking fuel cell stack parts (e.g., interconnects, fuel cells, etc.) 1502 and 1504. In an embodiment, system 1500 may be a part tracking system installed in a fuel cell component manufacturing facility or fuel cell stack assembly/disassembly facility. The system 1500 may include a microscope 1506 connected to a controller/processor 1508. The controller/processor 1508 may be connected wirelessly or by wires to a network 1510, such as the Internet or a factory intranet. A part tracking server 1512 managing a part tracking database 1513 may be connected wirelessly or wired to the network 1510, and via the network 1510 the controller/processor 1508 and part tracking server 1512 may exchange data. In operation, a portion of fuel cell stack part 1504 may be imaged by the microscope 1506 and the controller/processor 1508 may analyze the image of the fuel cell stack part 1504 to identify key features of the fuel cell stack part. The image of the fuel cell stack part 1504 and/or the identified key features may be sent via the network 1510 to the part tracking server 1512. In turn, the part tracking server 1512 may identify the fuel cell stack part corresponding to the image/key features and update the part tracking database 1513 accordingly. In an embodiment, controller/processor 1508 and the part tracking server 1512 may be the same controller/processor/server.

Figure 16:
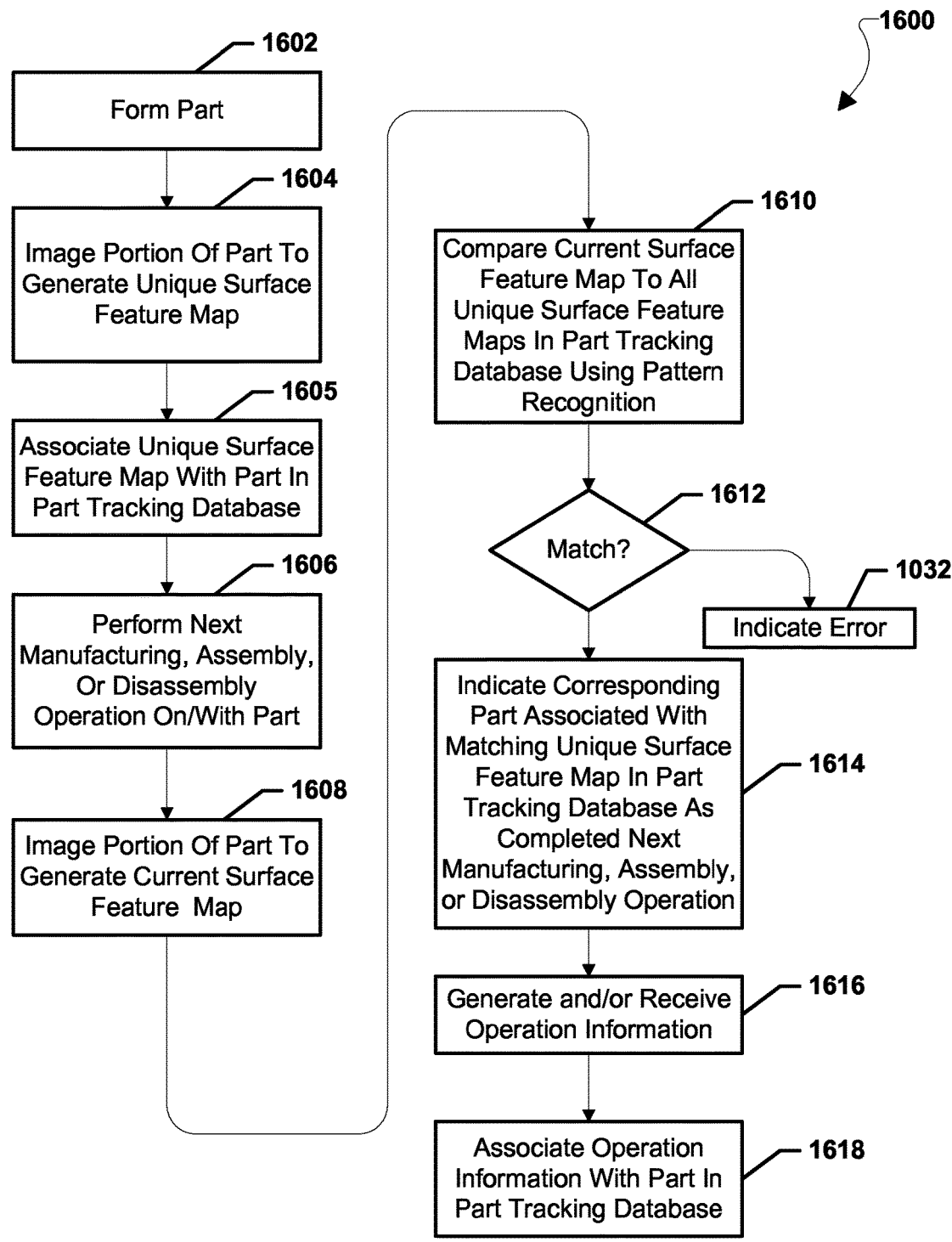
FIG. 16 is a process flow diagram illustrating a second embodiment method for part tracking.

FIG. 16 illustrates an embodiment method 1600 for tracking a fuel cell stack part. In block 1602 the fuel cell stack part may be formed. In block 1604 a portion of the part may be imaged to generate a unique surface feature map of the portion of the fuel cell stack part. As an example, a portion of the fuel cell stack part may be imaged under a microscope and pattern analysis may be applied to the image to identify key features of the portion of the fuel cell stack part. In block 1605 the part tracking server (e.g., part tracking server 1512 described above) may associate the unique surface feature map with the part in the part tracking database (e.g., part tracking database 1513 described above). As an example, the part tracking server may store the image of the portion and/or an indication of the key features in a data table in the part tracking database in a location correlated with the imaged part. In block 1606 the next manufacturing, stack assembly, or stack disassembly operation on/with the fuel cell stack part may be performed. As examples, the part may be sintered, oxidized, coated, added to a fuel cell stack, stack sintered/conditioned, removed from a fuel cell stack for failure analysis or refurbishment, etc. In block 1608 the portion of the part may be images to generate a current surface feature map. In block 1610 the part tracking server may compare the current surface feature map to all unique surface feature maps in the part tracking database using pattern recognition techniques. As an example, the part tracking server may compare one or more key feature of the current surface feature map to the unique surface feature maps in the part tracking database to determine a probability of a match between the key features of the current and unique surface feature maps. In determination block 1612 the part tracking server may determine whether any surface feature maps match. As an example, a surface feature map with a probability of matching above a match threshold may be determined to match. If there is no match (i.e., determination block 1612="No"), as discussed above, in block 1032 the part tracking server may indicate an error.

If there is a match (i.e., determination block 1612="Yes"), in block 1614 the part tracking server may indicate the corresponding part associated with the matching original particle map in the part tracking database as completed the next manufacturing, assembly, or disassembly operation. In this manner the status of the identified fuel cell stack part may be updated in the part tracking database. In block 1616 the part tracking server may generate and/or receive manufacturing information. In an embodiment, operation information may be information related to the manufacturing, assembly, or disassembly operation performed on the fuel cell stack part, such as sintering time, temperature, sintering furnace used, supervising technician, vendor performing the work, powder batch used, powder press dies used, oxidation furnace used, coating process information, etc. In block 1618 the part tracking server may associate the operation information with the record of the fuel cell stack part stored in the part tracking database.

FIG. 17 illustrates an example data table 1700 which may reside in a part tracking database according to an embodiment. The data table 1700 may be similar to data table 1100 illustrated in FIG. 11, except that rather than correlating a serialization, the data table 1700 may correlate an original particle map 1702 with each part number 1102. In this manner, parts may be tracked and information updated based on particle map matching.

In an embodiment, fuel cell interconnects may be individually tracked based on measured areas of the channels in defined locations on each fuel cell interconnect. Fuel cell interconnects may be fabricated by pressing and sintering a chromium rich powder. The final fuel cell interconnect component may be brittle and local heat treatments may cause micro cracks in the interconnect leading to failure. The pressing tools used to fabricate interconnects may be made of hard metals and operate at high compaction forces. It may be difficult to incorporate a per-interconnect serialization directly into the pressing process. An opportunity to serialize an interconnect may be after the initial pressing process before sintering of the interconnect. Individual serialization may be applied as numbers, letters, or barcodes via thermal (e.g., laser) or mechanical (e.g., engraving, stamping) manipulation. However, these forms of serialization may damage the interconnect, may be expensive, and may be time consuming.

In an embodiment, the fuel cell interconnect may be tracked using the unique fingerprint of discrete measurements of dimensions of the channel(s) of the interconnect. In an embodiment, the measurements may be areas in channels based on the length and width between ribs of the interconnect. In another embodiment, the measurements may be areas in channels based on the depth of the channel and width between ribs of the interconnect. In a further embodiment, the measurements may be volumes in channels based on the length, width, and depth between ribs of the interconnect. In an embodiment, the volume may be measured for a predetermined length of the channel. In another embodiment, the volume may be measured for a variable length of the channel. Using 3D scanning technologies the dimensions (e.g., areas and volumes) of the channel(s) of the interconnect may be measured. In an embodiment, laser triangulation with a high speed 3D camera may be used to measure the areas/volumes of the channel(s) of the interconnect in defined locations. The output of the measurements of the areas/volumes of the channel(s) of the interconnect may be evaluated and a pattern (i.e., series of area values or series of volume values) for each interconnect identified. In an embodiment, the series of area/volume values may enable vendor to vendor and/or batch to batch tracking. In a further embodiment, individual parts may be tracked by the series of area values. In an embodiment, the series of areas/volumes in one channel, or in a line across channels, may serve as a pseudo linear barcode for the interconnect. In a further embodiment, the series of areas in two or more channels may serve as a pseudo multi-dimensional barcode for the interconnect.

Figure 18A:
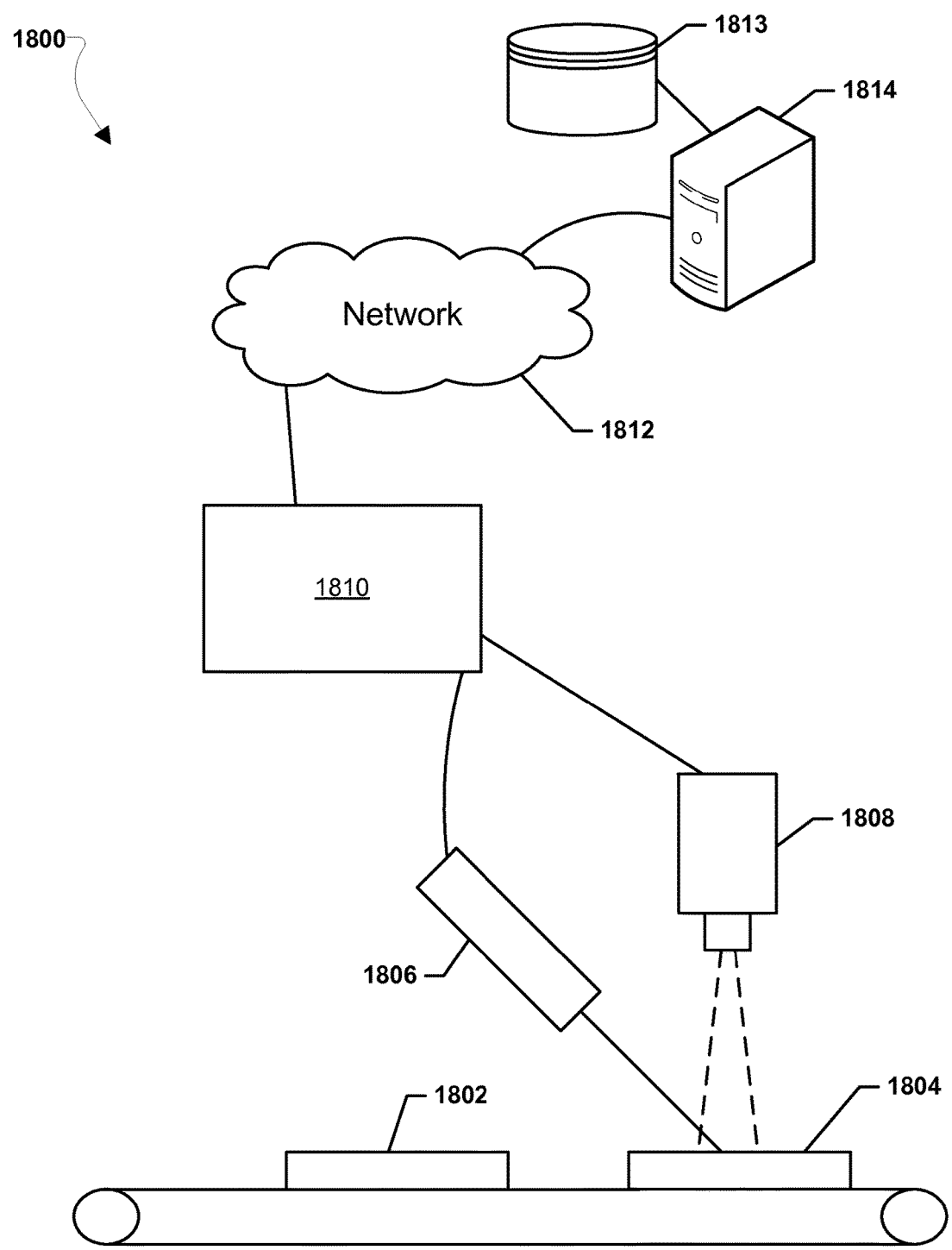
FIG. 18A illustrates a third part tracking system according to an embodiment.

FIG. 18A illustrates an embodiment laser triangulation system 1800 for tracking fuel cell interconnects 1802 and 1804. In an embodiment, system 1800 may be a part tracking system installed in a fuel cell component manufacturing facility or fuel cell stack assembly or disassembly facility. The system 1800 may include one or more cameras 1808 and one or more lasers 1806 configured to operate together as a three dimensional laser scanner which in operation may perform laser triangulation to measure features of an interconnect 1804 scanned by the one or more cameras 1808 and one or more lasers 1806. In operation the one or more lasers 1806 may provide a line or point shaped laser beam on the interconnect 1804 to be measured and the one or more cameras 1808 may look for the location of the laser dot. Depending on how far away the laser strikes a surface, the reflected laser beam may appear at different places in the one or more cameras' 1808 field of view enabling the interconnect 1804 to be measured. In an embodiment, the one or more lasers 1806 may each output 25 micrometer lines. The one or more cameras 1808 and one or more lasers 1806 may each be connected to a controller/processor 1810 which may control the operations of the one or more cameras 1808 and one or more lasers 1806 to measure the interconnect 1804. The controller/processor 1810 may connect wireless or be wired to a network 1812, such as the Internet or a factory intranet. A part tracking server 1814 managing a part tracking database 1813 may be connected wirelessly or by wires to the network 1812, and via the network 1812 the controller/processor 1810 and part tracking server 1814 may exchange data. In operation, a portion of an interconnect 1804 may be measured by the one or more cameras 1808 and one or more lasers 1806 to generate a 3D image of the interconnect 1804 and the controller/processor 1810 may analyze the 3D image of the interconnect 1804 to measure areas of the portion of the interconnect 1804 and generate one or more series of area values for the fuel and/or air channels in the interconnect 1804. The 3D image of the interconnect 1804 and/or the series of area values of the interconnect 1804 may be sent via the network 1812 to the part tracking server 1814. In turn, the part tracking server 1814 may identify the interconnect corresponding to the 3D image/series of area values and update the part tracking database 1813 accordingly. In an embodiment, controller/processor 1810 and the part tracking server 1814 may be the same controller/processor/server.

Figure 18B:
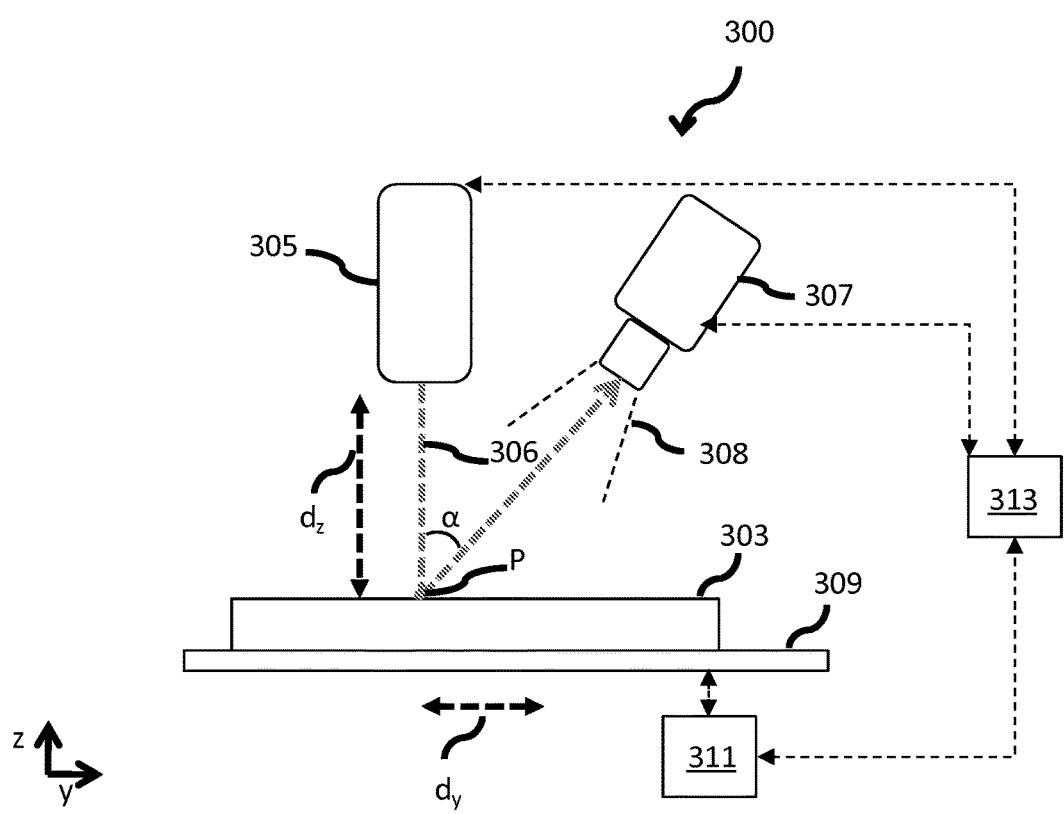
FIGS. 18B and 18C illustrate a laser triangulation system suitable for use with the various embodiments.
Figure 18C:
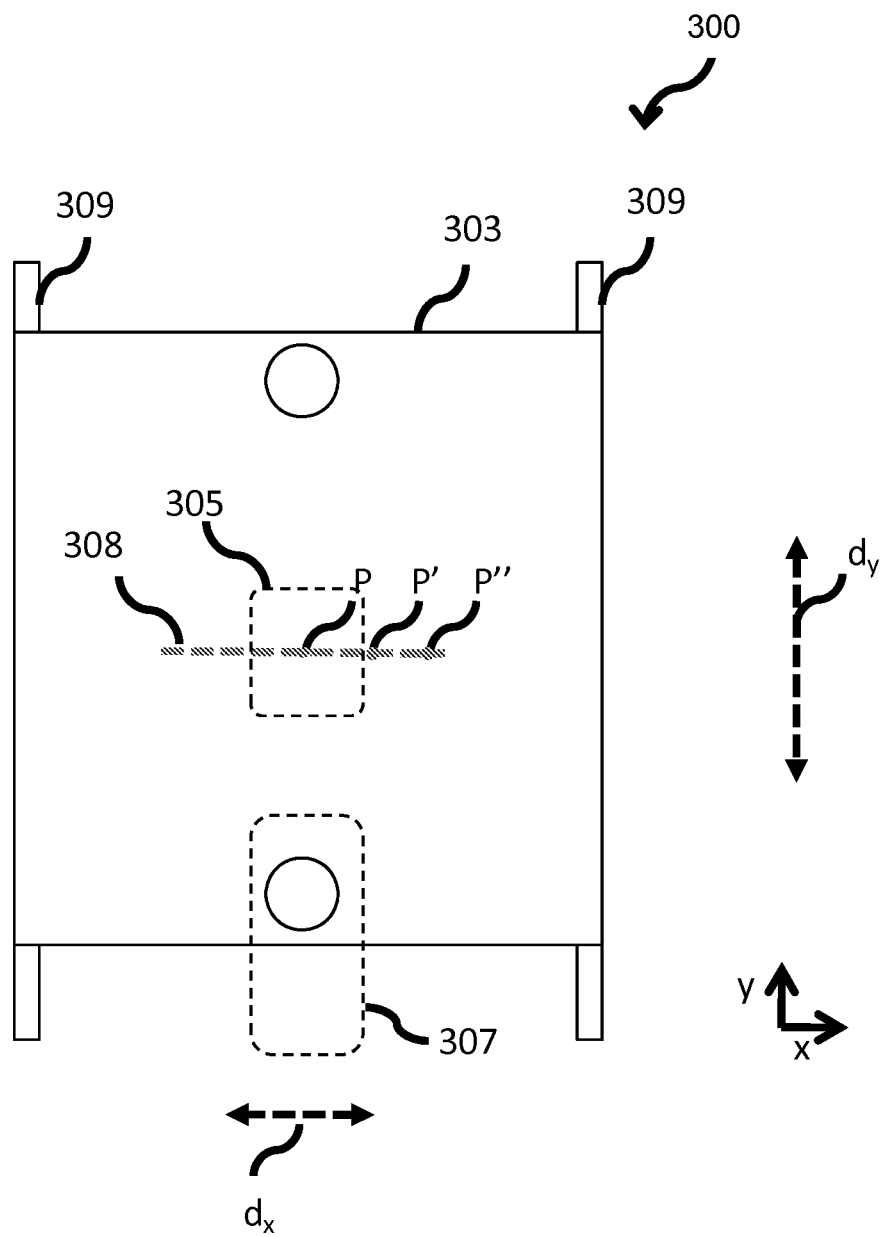

FIGS. 18B and 18C schematically illustrate a system 300 for measuring a property of a component of a fuel cell system using optical triangulation. In an embodiment, the system 300 may be similar to the system 1800 described above with reference to FIG. 18A. In one embodiment, as shown in the side-view of FIG. 18B, the system 300 includes a source 305 for directing an optical radiation beam 306 onto a fuel cell component 303. An optical detector 307, such as a camera, is positioned to detect radiation reflected from the surface of the fuel cell component 303. The source may be a laser source that generates a laser beam, which may be single beam that projects a single point (i.e., laser dot) on the surface of the component 303, or may simultaneously project a plurality of contiguous or non-contiguous points, such as a line 308 as shown in the overhead view of FIG. 18C. (The source 305 and detector 307 are shown in phantom in FIG. 18C to more clearly illustrate the beam 306 and fuel cell component 303). In some embodiments, the component 303 of a fuel cell system can be an interconnect for a fuel cell stack. The component 303 can also be an electrolyte plate or layer, including raw electrolyte material, or an electrolyte plate or layer having one or more electrodes provided on the electrolyte, and can be a finished cell stack.

The system 300 may use optical triangulation (e.g., laser triangulation) to measure one or more properties of the component 303. In an optical triangulation technique, an optical radiation source 305 (e.g., a laser source) directs a beam 306 onto a component 303, and a detector 307 (e.g., a camera) detects radiation (e.g., a laser dot) reflected from at least one point (P) on the surface of the component 303. Depending on how far the beam travels from the source 306 before striking the surface of the component 303, the reflected radiation from a point P of the surface will appear at different places (e.g., different pixel locations) in the field of view 309 of the detector 307. The detector 307 typically includes a lens to focus the reflected beam onto the detector elements, which may comprise a CCD array, for example.

In an optical triangulation measurement, the source 305, the detector 307 and a point, P, on the surface of the component 303 being measured form a triangle. The source 305 and detector 307 may be in a fixed position and orientation relative to each other, and the distance between the source 305 and detector 307 (i.e., a first side of the triangle) and the angle at which the beam 306 is directed at the component 303 (i.e., one angle of the triangle) are known. A second angle of the triangle, the angle $\alpha$ at which the beam 306 is reflected from point P, may be determined based on the location of the laser dot in the field of view of the detector 307. These three pieces of information fully determine the shape and size of the triangle and gives the location of the corner of the triangle corresponding to point P. The further away P is from the source 305 and detector 307, the smaller the angle $\alpha$, and the closer point P is to the source 305 and detector 307, the larger the angle $\alpha$.

As shown in FIG. 18B, a height or z-axis dimension of point P (i.e., the distance, $d_z$, between the point P and the source 305, corresponding to a second side of the triangle) may be measured using the triangulation technique. Alternatively, the distance between point P and the detector 307 (i.e., the third side of the triangle) can be measured. The interrogating beam 306 may be scanned across all or a portion of the surface of the component 303 while the detector 307 obtains z-axis measurements (i.e., $d_z$ measurements) of the surface to provide a three-dimensional representation of the topography of the component 303. For example, as shown in FIGS. 18B and 18C, the component 303 may be moved relative to the source 305 and detector 307 in a second direction (i.e., y-axis direction), orthogonal to the direction of the height measurements (i.e., z-axis measurements) to obtain $d_z$ measurements at different distances, $d_y$, along the y-axis dimension of the component 303. The interrogating beam 306 may produce a line 308 (see FIG. 18C) that scans across the surface of the component 303 in a third orthogonal direction (i.e., x-axis direction) to enable simultaneous $d_z$ measurements for an arbitrary number of points, P, P', P" along the line 308. In embodiments, the line 308 may have sufficient length to scan the entire x-axis dimension of the component 303 in a single pass. In other embodiments, such as shown in FIG. 18C, the line 308 may be shorter than the x-axis dimension of the component 303, and the x-axis dimension of the component 303 may be scanned in multiple passes or by using multiple source 305 and detector 307 pairs arranged along the x-axis direction.

In embodiments, the beam 306 may be a focused optical beam (e.g., a laser beam) having a width of 20-100 μm in at least one direction (e.g., the y direction). The beam may be elongated in a second direction (e.g., the x-direction) and may have a length of 1-100 mm, for example, such as 30-50 mm (e.g., ~40 mm).

A support 309, such as a conveyer belt or a pair of rails, may support the component 303 during the measurement. A drive system 311 may be coupled to the support 309 for moving the component 303 during the measurement. As shown in FIGS. 18B and 18C, the drive system 311 may move the component 303 along the y-axis direction. In other embodiments, the drive system 311 may additionally or alternatively move the component 303 along the x-axis direction. In addition, the drive system 311 may additionally or alternatively be coupled to the source 305 and detector 307 for moving the source 305 and detector 307 relative to the component 303.

In one embodiment, a controller 313 can be electronically coupled to the source 305 and detector 307, as shown in FIG. 18B. Controller 313 can be a logic device (e.g., computer) and can include a memory and a processor coupled to the memory, wherein the processor can be configured with processor-executable instructions for performing various functions. In one embodiment, the controller 313 is configured to control the operation of the source 305 and detector 307, and may be configured to cause the source 305 to direct an optical beam 306 to the component 303. The controller 313 may also be electronically coupled to the drive system 311 for controlling the movement of the component 303 relative to the source 305 and the detector 307 to perform a scan of the component 303 or of a portion thereof. The controller 308 may also be configured to receive image data from the detector 307, and based on the image data, to calculate the height (i.e., $d_z$) values for various points on the surface of the component 303 and to use these values to produce a three-dimensional representation of the topography of at least one surface of the component 303. The controller may also be configured to measure at least one property of the component 303 based on the three-dimensional topological representation, as described below.

Figure 19:
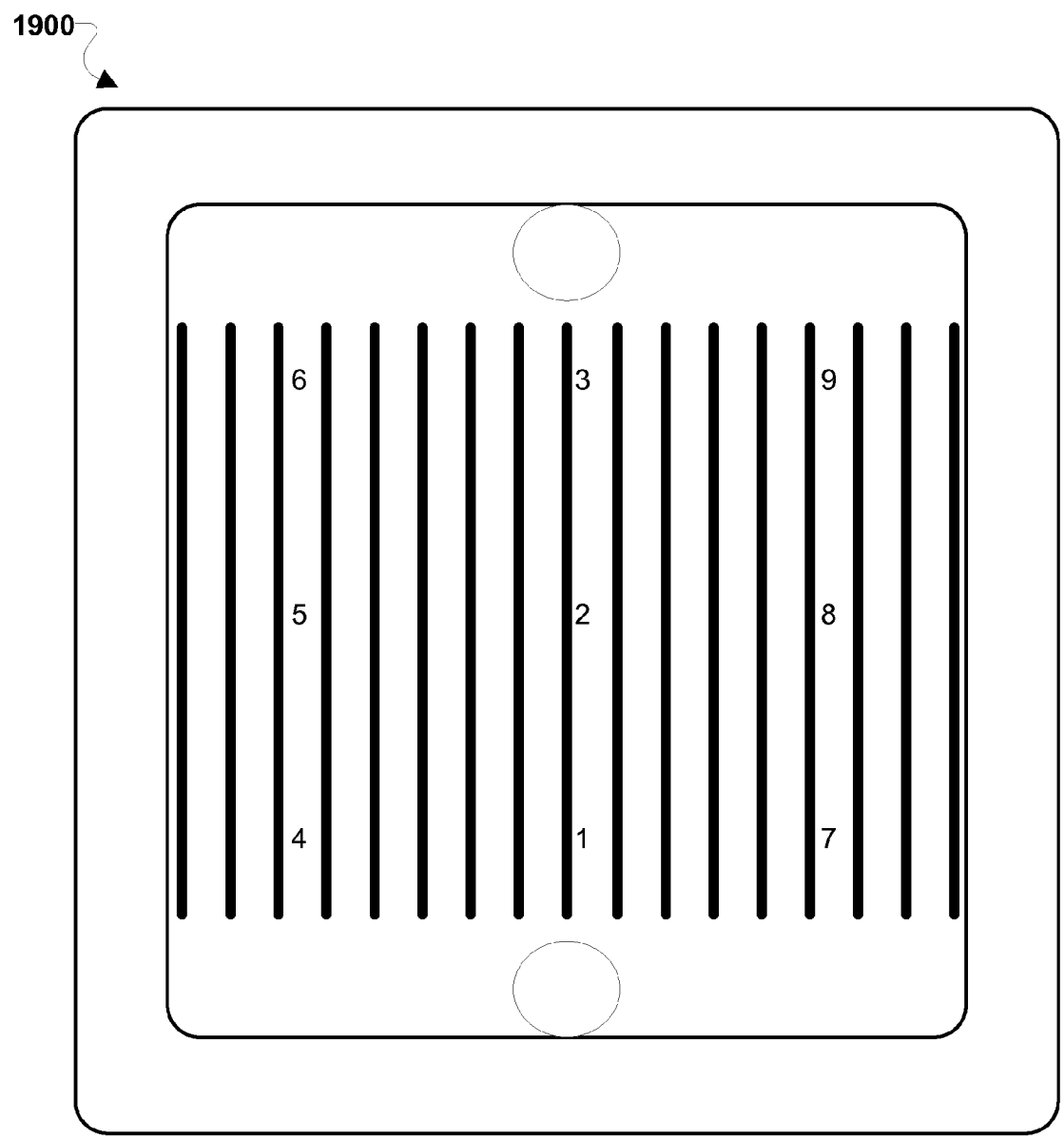
FIGS. 19, 20A, 20B, 21 illustrate 3D images of fuel cell interconnects.

FIG. 19 is a visual representation of a 3D image 1900 of an interconnect. The interconnect may include multiple channels defined between ribs of the interconnect. The area of the channels may vary across the interconnect. In an embodiment, the interconnect may be subdivided into regions 1, 2, 3, 4, 5, 6, 7, 8, and 9. In an embodiment, each region 1, 2, 3, 4, 5, 6, 7, 8, and 9 may be a quasi multi-dimensional barcode.

Figure 20A:
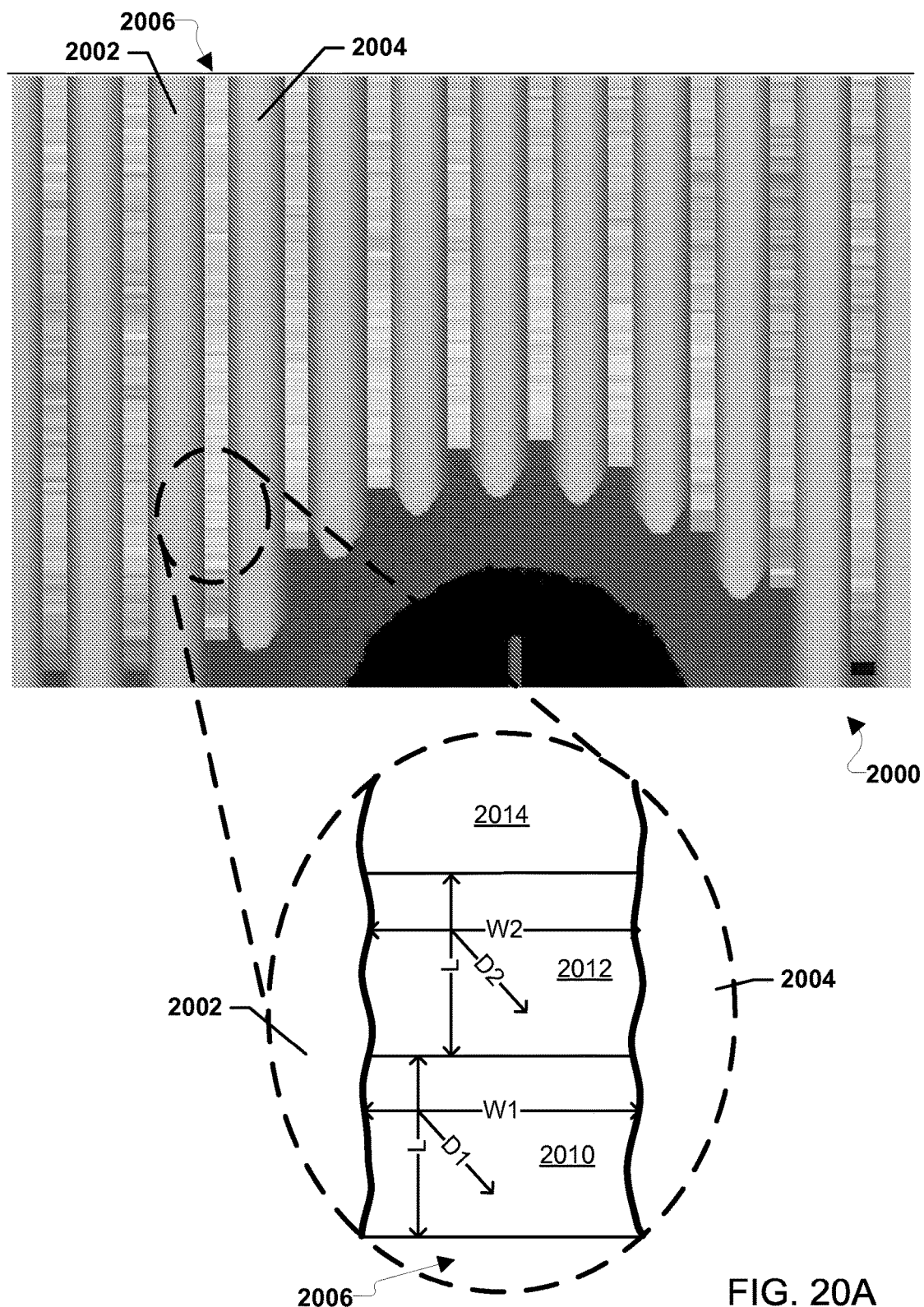

FIG. 20A is a close up schematic representation of a 3D image of a fuel cell interconnect 2000. The region 2006 between two ribs 2002 and 2004 of the interconnect 2000 may define the channel 2006. As shown in the exploded portion of the 3D image, the variations in width and depth of the channel 2006 between the ribs 2002 and 2004 may define portions 2010, 2012, and 2014 which have different measurements. In an embodiment, the portions 2010, 2012, and 2014 for the channel 2006 may all have the same fixed length measurement (L) along the channel 2006. The length measurement (L) may be any length, such as less than 20 microns, 20-25 microns, or 25 microns or greater. In this manner, the length (L) may be the same for each portion of the channel 2010, 2012, and 2014 and the width and depth for each portion 2010, 2012, and 2014 may vary. In this manner, each portion 2010, 2012, and 2014 may have its own volume value. As an example, the volume of portion 2010 may be defined by length (L), width (W1), and depth (D1) and volume of portion 2012 may be defined by the same length (L) and different width (W2) and different depth (D2). In an embodiment, because the length of each portion is the same (L), the volumes of portions 2010, 2012, and 2014 may be converted to areas (A) 2010, 2012, and 2014 defined by their respective width and depth by factoring out the common length (L). Each of these discrete channel areas may then be squared to generate discrete channel squared area values ($A^2$) for each portion 2010, 2012, and 2014. The values assigned to each portion 2010, 2012, and 2014 may function as a unique series of area or volume values which distinguish one interconnect from another. In this manner, a series of area or volume values may operate as a fingerprint or barcode uniquely identifying each interconnect.

Figure 20B:
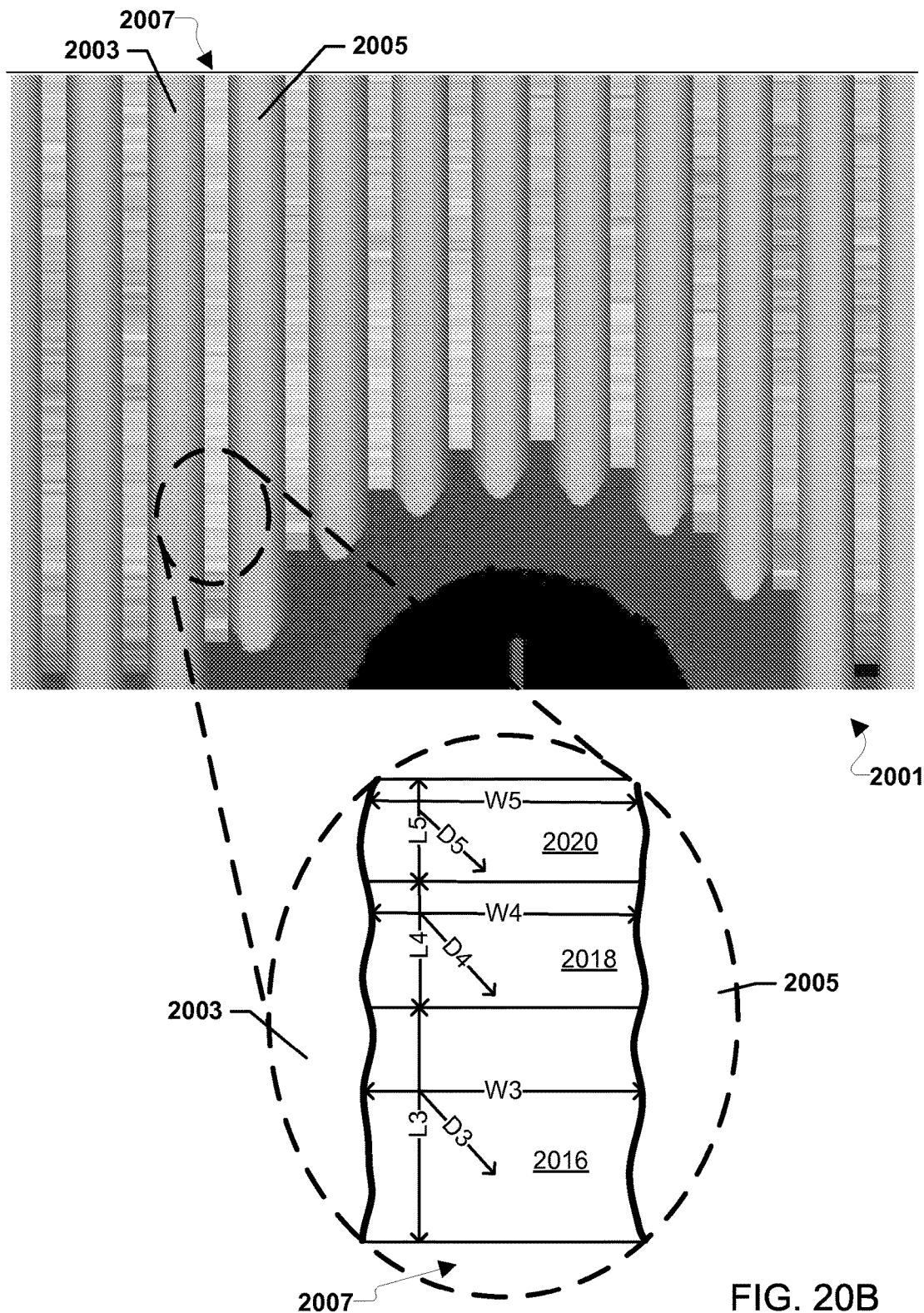

FIG. 20B is a close up schematic representation of a 3D image of a fuel cell interconnect 2001 similar to fuel cell interconnect 2000 illustrated in FIG. 20A, except that the length of each portion may be variable. The region 2007 between two ribs 2003 and 2005 of the interconnect 2001 may define the channel 2007. As shown in the exploded portion of the 3D image, the variations in length, width, depth of the channel 2007 between the ribs 2003 and 2005 may define portions 2016, 2018, and 2020 which have different measurements. In an embodiment, the portions 2016, 2018, and 2020 may have different volumes (V). As an example, the volume of portion 2016 may be defined by length L3, width W3, and depth D3, the volume of portion 2018 may be defined by length L4, width W4, and depth D4, and the volume of portion 2020 may be defined by length L5, width W5, and depth D5. The values of the volumes of the portions 2016, 2018, and 2020 may be discrete values which may uniquely define the interconnect 2001.

Figure 21:
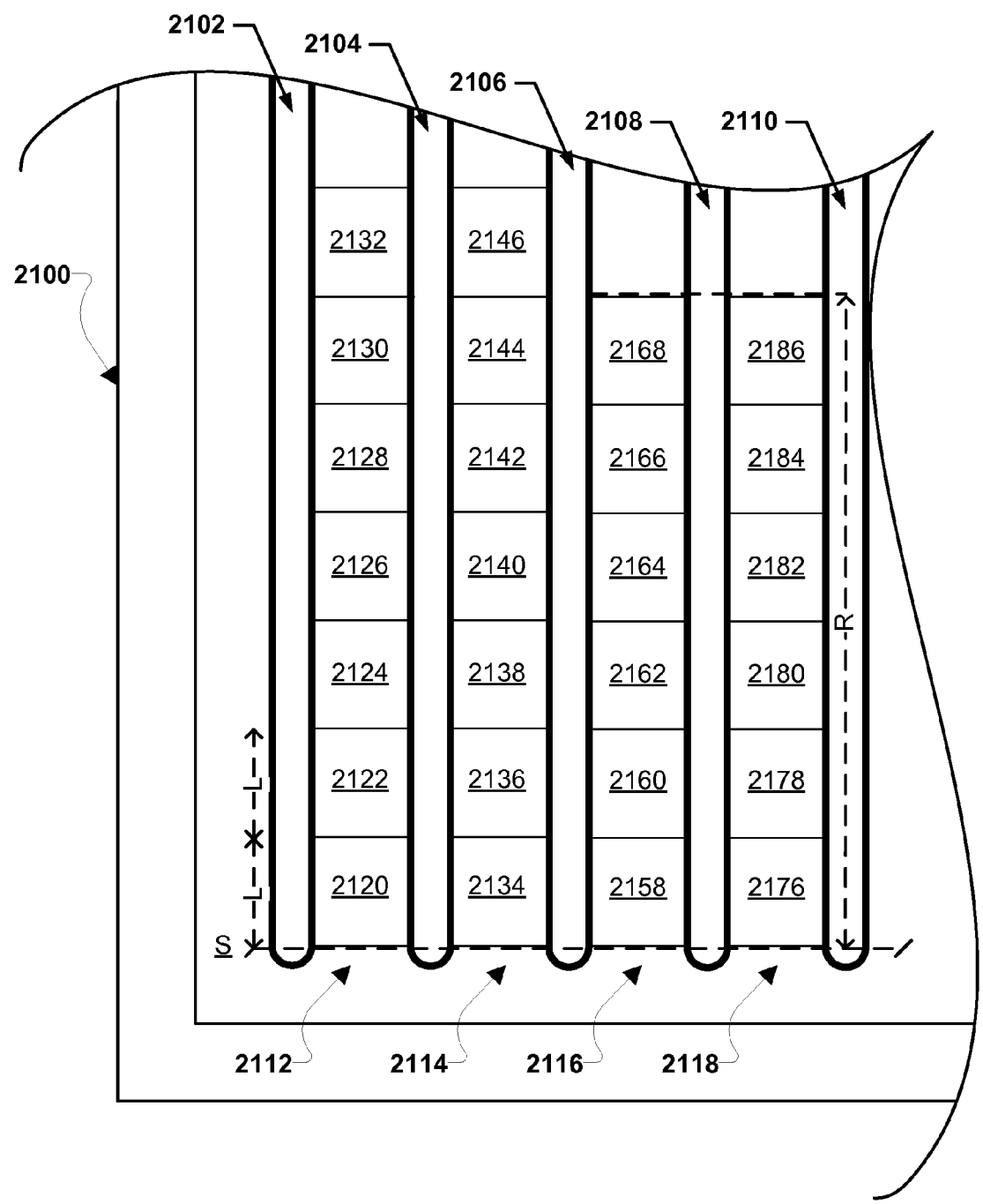

FIG. 21 illustrates a portion of a schematic 3D image of a fuel cell interconnect 2100 according to an embodiment. Five ribs 2102, 2104, 2106, 2108, and 2110 are illustrated, defining four channels 2112, 2114, 2116, 2118, respectively, between them. In an embodiment, each channel may be measured by dividing the channel into a series of portions starting from a start (S) of the channel. In an embodiment, each portion may have the same length (L). In an embodiment, the entire length of the channel may be divided into portions, such as channel 2112 which may be divided into portions 2120, 2122, 2124, 2126, 2128, 2130, and 2132 each having the same portion length (L) and channel 2114 which may be divided into portion 2134, 2136, 2138, 2140, 2142, 2144, and 2146 each having the same portion length (L). In another embodiment, only a fixed range (R) of the channel may be measured by dividing the channel into portions, such as channel 2116 which may divided into portions 2158, 2160, 2162, 2164, 2166, and 2168 and channel 2118 which may be divided into portion 2176, 2178, 2180, 2182, 2184, and 2186. In an embodiment, the length, width, and depth measured for each portion may determine a volume for that portion. In a further embodiment, because the length (L) for each portion may be the same, the length may be factored out and an area for each portion may be determined based on the portions width and depth.

In an embodiment, a series of volume/area values for an entire channel may be used as a pseudo linear barcode to identify interconnect 2100. As an example, the measured volumes or areas of portions 2120, 2122, 2124, 2126, 2128, 2130, and 2132 of channel 2112 may be used as a pseudo linear barcode to identify interconnect 2100.

In another embodiment, a series of volume/area value for a fixed range (R) less than the entire length of a channel may be used as a pseudo linear barcode to identify interconnect. As an example, the measured volumes or areas of portions 2176, 2178, 2180, 2182, 2184, and 2186 over the fixed range (R) of channel 2118 may be used as a pseudo linear barcode to identify interconnect 2100.

In another embodiment, more than one series of volume/area values for channels 2112, 2114, 2116, and 2118 may be used together as a pseudo multi-dimensional barcode to identify interconnect 2100. As an example, the series of volume/area values for channels 2112 and 2114 may be used together as a two dimensional barcode. As another example, the series of volume/area values for channels 2112, 2114, and 2116 may be used together as a two dimensional barcode. As further example, the series of volume/area values for channels 2112, 2114, 2116, and 2118 may be all used together as a multi-dimensional barcode.

In another embodiment, the measurements (e.g., volume or area) of at least one portion of each channel 2112, 2114, 2116, and 2118 may be used together as a pseudo linear barcode to identify interconnect 2100. For example, the volume or area value of each first portion 2120, 2134, 2158, and 2176 measured in a line from a channel starting point (S) common to each respective channel 2112, 2114, 2116, and 2118 may be used as a pseudo linear barcode to identify interconnect 2100.

Figure 22:
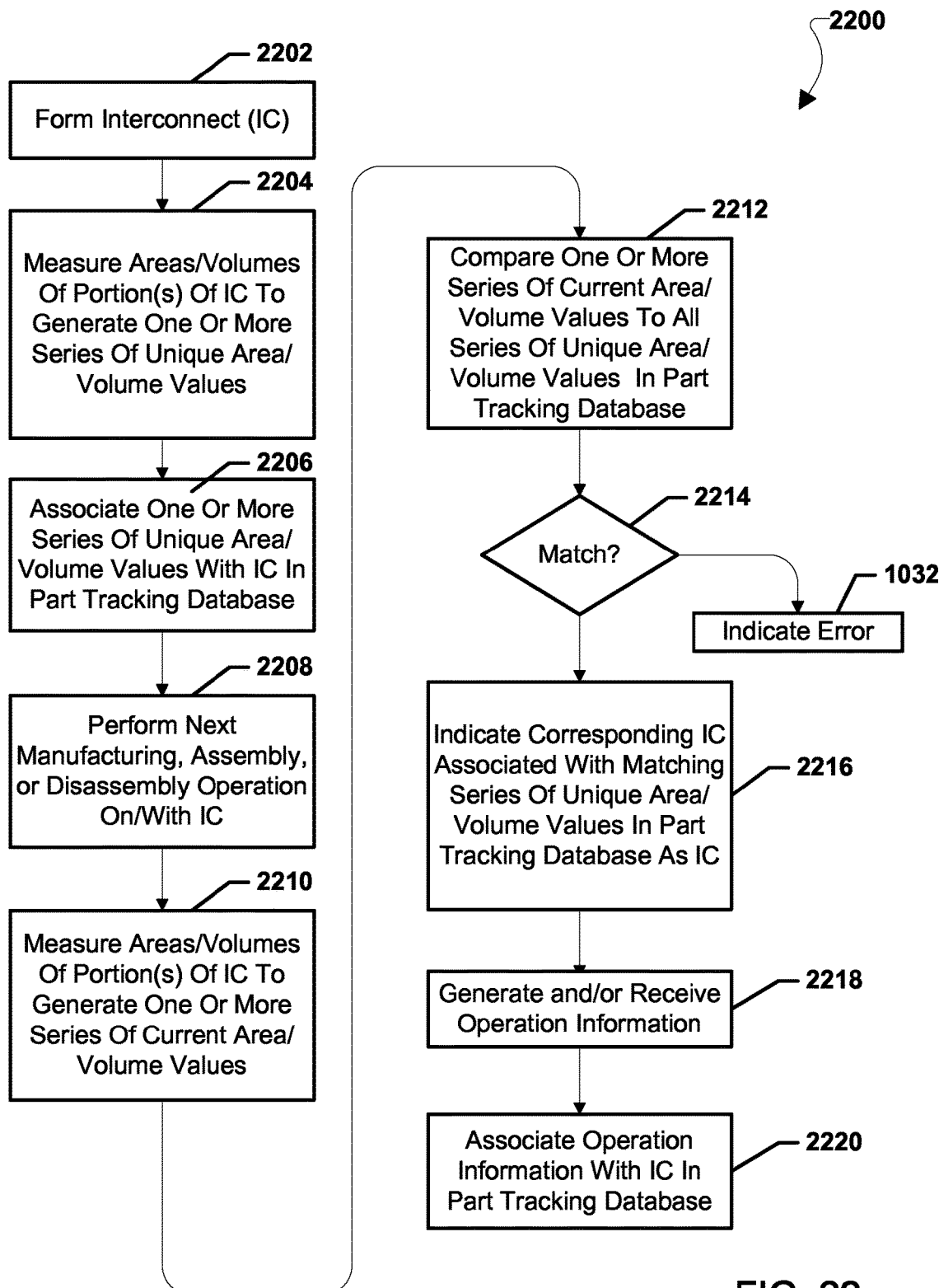
FIG. 22 is a process flow diagram illustrating a third embodiment method for part tracking.

FIG. 22 illustrates an embodiment method 2200 for tracking a fuel cell interconnect. In block 2202 the interconnect (IC) may be formed. In block 2204 areas of one or more portions of the interconnect may be measured to generate one or more series of unique area/volume values. As an example, one or more portions of one or more channels of the fuel cell interconnect may be measured by laser triangulation to generate one or more series of unique area/volume values before or after sintering. In block 2206 the part tracking server may associate the one or more series of unique area/volume values with the interconnect in a part tracking database. As an example, the part tracking server may store the one or more series of unique area/volume values in a data table in the part tracking database in a location correlated with the measured interconnect. In block 2208 the next manufacturing, stack assembly, or stack disassembly operation on/with the interconnect may be performed. As examples, the interconnect may be sintered, oxidized, cleaned, coated, etc. In block 2210 areas of one or more portions of the interconnect may be measured to generate one or more series of current volume/area values. In block 2212 the part tracking server may compare the one or more series of current volume/area values to all series of unique volume/area values in the part tracking database. In determination block 2214 the part tracking server may determine whether any series of volume/area values match.

If there is no match (i.e., determination block 2214="No"), as discussed above, in block 1032 the part tracking server may indicate an error.

If there is a match (i.e., determination block 2214="Yes"), in block 2216 the part tracking server may indicate the corresponding interconnect associated with the matching series of unique area/volume values in the part tracking database as completed the next manufacturing, stack assembly, or stack disassembly operation. In this manner, the status of the identified interconnect may be updated in the part tracking database. In block 2218 the part tracking server may generate and/or receive operation information. In an embodiment, operation information may be information related to the manufacturing, stack assembly, or stack disassembly operation performed on the interconnect, such as sintering time, temperature, sintering furnace used, supervising technician, vendor performing the work, powder batch used, powder press dies used, oxidation furnace used, coating information, company information, etc. In block 2220 the part tracking server may associate the operation information with the record of the interconnect stored in the part tracking database.

Figure 23:
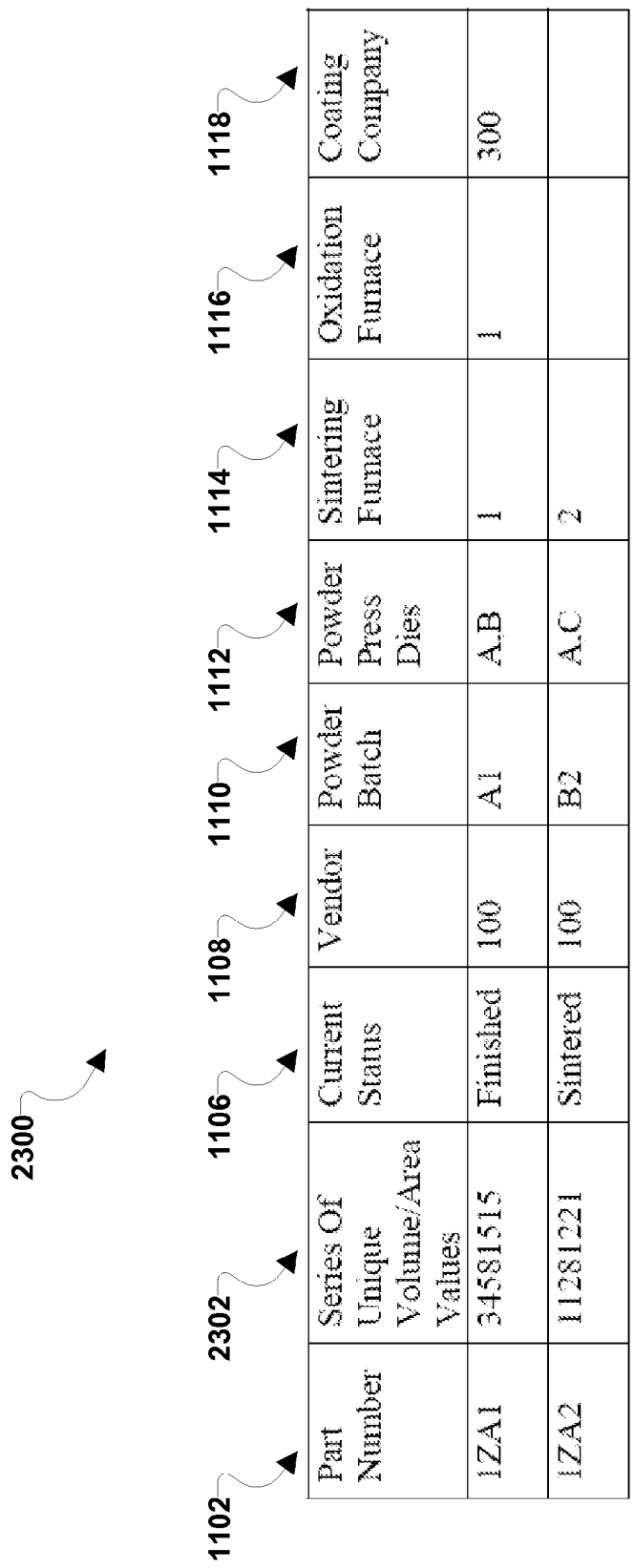
FIG. 23 illustrates an example data table according to another embodiment.

FIG. 23 illustrates an example data table 2300 which may reside in a part tracking database according to an embodiment. The data table 2300 may be similar to data table 1100 illustrated in FIG. 11, except that rather than correlating a generated serialization, the data table 2300 may correlate a series of unique volume/area values measured for each part number 1102. In this manner, parts may be tracked and information updated based on series of volume/area value matching.

Figure 24:
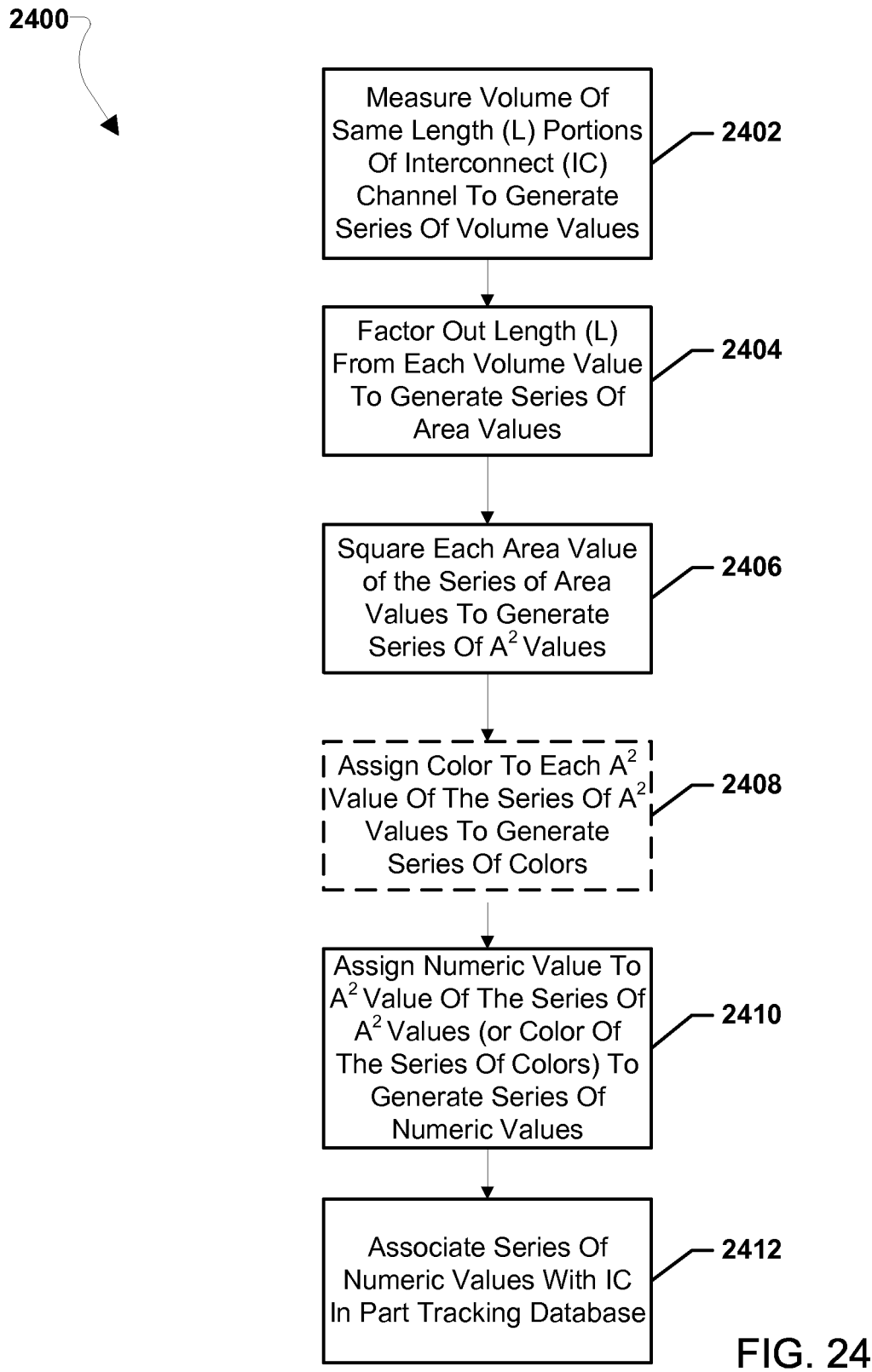
FIG. 24 is a process flow diagram illustrating an embodiment method for generating a series of numeric values associated with an interconnect for part tracking.

FIG. 24 illustrates an embodiment method 2400 for generating a series of numeric values associated with an interconnect for part tracking. In an embodiment, the operations of method 2400 may be performed in conjunction with the operations of method 2200 described above with reference to FIG. 22 to measure areas/volumes of portion(s) of the interconnect to generate one or more series of unique area/volume values and associate one or more series of unique area/volume values with the interconnect in a part tracking database. In block 2402 the volume of same length (L) portions of the interconnect (IC) channel may be measured to generate a series of volume values. As an example, one or more portions of one or more channels of the fuel cell interconnect may be measured by laser triangulation to generate one or more series of unique volume values before or after sintering. In block 2404 the length (L) may be factored out from each volume value of the series of volume values to generate a series of area values. In this manner, the three dimensional volume values may be converted to two dimensional area values. In block 2406 each area value of the series of area values may be squared to generate a series of $A^2$ values. In this manner, the three dimensional volume values which were converted to two dimensional area values may be converted into three dimensional approximations of an area squared ($A^2$).

In an optional embodiment, in optional block 2408 a color may be assigned to each $A^2$ value of the series of $A^2$ values to generate series of colors. As an example, $A^2$ values falling within a first $A^2$ value range may be assigned a first color, $A^2$ values falling within a second $A^2$ value range may be assigned a second color, and $A^2$ values falling within a third $A^2$ value range may be assigned a third color.

In block 2410 a numeric value may be assigned to each $A^2$ value of the series of $A^2$ values, or to the optional colors of the optionally generated series of colors to generate a series of numeric values. As an example, $A^2$ values falling within a first $A^2$ value range may be assigned a first bit value, $A^2$ values falling within a second $A^2$ value range may be assigned a second bit value, and $A^2$ values falling within a third $A^2$ value range may be assigned a third bit value, and the series of numeric values may be a combination of all bit values for the $A^2$ values in the series of $A^2$ values. As another example, each color or each volume or area may be assigned a bit value and the series of numeric values may be a combination of all bit values for the colors in the series of colors. In block 2412 the part tracking server may associate the series of numeric values with the interconnect in the part tracking database. In an embodiment, the operations of blocks 2404, 2406, 2408, 2410, and 2412 of method 2400 may be performed by a controller/processor or server of a part tracking system (e.g., part tracking system 1800 described above) as post processing of interconnect measurements.

Figure 25:
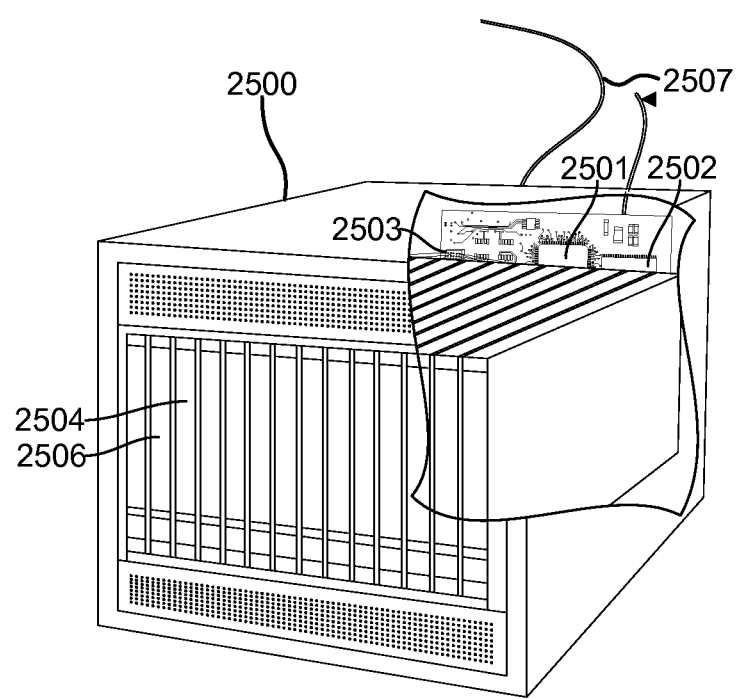
FIG. 25 is a block diagram of a server suitable for use with the various embodiments.

The embodiments described above may be implemented with any of a variety of server devices, such as the server 2500 illustrated in FIG. 25. Such a server 2500 typically includes a processor 2501 coupled to volatile memory 2502 and a large capacity nonvolatile memory, such as a disk drive 2504. The server 2500 may also include a floppy disc drive and/or a compact disc (CD) drive 2506 coupled to the processor 2501. The server 2500 may also include network access ports 2503 coupled to the processor 2501 for establishing data connections with network circuits 2507, such as the Internet.

The processor 2501 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to communication functions and one processor dedicated to running other applications. Typically, software applications may be stored in the internal memory 2502 and 2504 before they are accessed and loaded into the processor 2501. The processor 2501 may include internal memory sufficient to store the application software instructions. In many devices the internal memory may be a volatile or nonvolatile memory, such as flash memory, or a mixture of both. For the purposes of this description, a general reference to memory refers to memory accessible by the processor 2501 including internal memory or removable memory plugged into the device and memory within the processor 2501 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method for tracking a fuel cell stack part, comprising:
forming a green fuel cell stack part;
applying a serialization to the green fuel cell stack part;
associating the serialization and the fuel cell stack part in a fuel cell part tracking database;
sintering the green fuel cell stack part to create a sintered fuel cell stack part, wherein the sintering permanently imprints the serialization onto the sintered fuel cell stack part;
identifying the serialization on the sintered fuel cell stack part; and
updating a status of the fuel cell stack part in the fuel cell part tracking database based on the identified serialization.

2. The method of claim 1, wherein the serialization is a barcode.

3. The method of claim 2, wherein the barcode is selected from the group comprising a single dimension barcode and a multi-dimensional barcode.

4. The method of claim 1, wherein applying the serialization to the green fuel cell stack part comprises applying an ink to a surface of the green fuel cell stack part to print the serialization on the surface of the green fuel cell stack part.

5. The method of claim 4, wherein applying an ink to a surface of the green fuel cell stack part to print the serialization on the surface of the green fuel cell stack part comprises inkjet printing the serialization on the surface of the green fuel cell stack part.

6. The method of claim 4, wherein the fuel cell stack part is an interconnect or a fuel cell.

7. The method of claim 6, wherein the fuel cell stack part is an interconnect and the ink comprises $TiO_2$ or the fuel cell stack part is a fuel cell and the ink comprises iron manganese oxide.

8. A method for tracking a fuel cell stack part, comprising:
forming a fuel cell stack part, wherein the part comprises a solid oxide fuel cell ceramic electrolyte or a chromium iron alloy interconnect for a solid oxide fuel cell stack;
applying a printed ink barcode serialization to the fuel cell stack part; and
associating the serialization and the fuel cell stack part in a fuel cell part tracking database.

9. The method of claim 8, wherein the serialization is printed using the ink which is tolerant to at least 1250 degrees Celsius.

10. The method of claim 9, wherein the barcode is selected from the group comprising a single dimension barcode and a multi-dimensional barcode.

* * * * *